US009726063B2

(12) United States Patent
Sampath et al.

(10) Patent No.: US 9,726,063 B2
(45) Date of Patent: Aug. 8, 2017

(54) IN-LINE FLOW DIVERTER

(71) Applicant: Tenneco Automotive Operating Company Inc., Lake Forest, IL (US)

(72) Inventors: Manoj K. Sampath, Ann Arbor, MI (US); Ryan A. Floyd, Mason, MI (US)

(73) Assignee: Tenneco Automotive Operating Company Inc., Lake Forest, IL (US)

(*) Notice: Subject to any disclaimer, the term of this patent is extended or adjusted under 35 U.S.C. 154(b) by 0 days.

(21) Appl. No.: 14/956,727

(22) Filed: Dec. 2, 2015

(65) Prior Publication Data

US 2016/0084133 A1 Mar. 24, 2016

Related U.S. Application Data

(63) Continuation-in-part of application No. 14/193,499, filed on Feb. 28, 2014, now Pat. No. 9,347,355, which is a continuation-in-part of application No. 13/227,952, filed on Sep. 8, 2011, now Pat. No. 8,677,738.

(51) Int. Cl.
*F01N 3/20* (2006.01)
*F01N 3/28* (2006.01)

(52) U.S. Cl.
CPC .......... *F01N 3/2066* (2013.01); *F01N 3/2892* (2013.01); *F01N 2240/20* (2013.01); *F01N 2610/146* (2013.01); *Y02T 10/24* (2013.01)

(58) Field of Classification Search
CPC ... F01N 2240/20; F01N 3/2066; F01N 3/2892
See application file for complete search history.

(56) References Cited

U.S. PATENT DOCUMENTS 3,958,757 A 5/1976 Happel et al.
4,065,918 A * 1/1978 Rifkin .................. F01N 3/2892 422/180
4,292,947 A 10/1981 Tanasawa et al.
4,742,964 A 5/1988 Ito et al.
4,805,837 A 2/1989 Brooks et al.
4,909,635 A 3/1990 Lecoffre et al.
5,307,997 A 5/1994 Wakeman
5,339,630 A 8/1994 Pettit
5,406,790 A 4/1995 Hirota et al.
5,522,218 A 6/1996 Lane et al.
5,570,841 A 11/1996 Pace et al.
(Continued)

FOREIGN PATENT DOCUMENTS

DE 2418227 A1 10/1975
DE 10241697 A1 4/2003
(Continued)

*Primary Examiner* — Patrick Maines
(74) *Attorney, Agent, or Firm* — Harness, Dickey & Pierce, P.L.C.

(57) ABSTRACT

An exhaust gas treatment system for reducing emissions from an engine includes an exhaust conduit adapted to supply an exhaust stream from the engine to an exhaust treatment device. An injector injects a reagent through an aperture in the conduit into the exhaust stream. A flow modifier is positioned within the exhaust conduit and comprises a plate including a plurality of bores spaced apart from one another and positioned about a periphery of the plate. The plate also includes a plurality of slots positioned in parallel with each other.

27 Claims, 21 Drawing Sheets

(56) References Cited

U.S. PATENT DOCUMENTS

| | | | |
|---|---|---|---|
| 5,605,042 | A | 2/1997 | Stutzenberger |
| 5,713,327 | A | 2/1998 | Tilton et al. |
| 5,924,280 | A | 7/1999 | Tarabulski |
| 5,976,475 | A | 11/1999 | Peter-Hoblyn et al. |
| 6,063,350 | A | 5/2000 | Tarabulski et al. |
| 6,470,676 | B2 | 10/2002 | Dolling et al. |
| 6,539,708 | B1 | 4/2003 | Hofmann et al. |
| 6,604,850 | B1 | 8/2003 | Schneider et al. |
| 6,609,590 | B2 | 8/2003 | Zelinski |
| 6,623,155 | B1 | 9/2003 | Baron |
| 6,708,904 | B2 | 3/2004 | Itatsu |
| 6,742,330 | B2 | 6/2004 | Genderen |
| 7,100,366 | B2 | 9/2006 | Hager et al. |
| 7,152,396 | B2 | 12/2006 | Cheng |
| 7,434,570 | B2 | 10/2008 | Hill |
| 7,509,799 | B2 | 3/2009 | Amou et al. |
| 7,775,322 | B2 | 8/2010 | Hill |
| 8,006,487 | B2 | 8/2011 | Gaiser |
| 8,033,101 | B2 | 10/2011 | Amon et al. |
| 8,047,452 | B2 | 11/2011 | Martin et al. |
| 8,114,364 | B2 | 2/2012 | Harinath et al. |
| 8,141,353 | B2 | 3/2012 | Zheng et al. |
| 8,196,388 | B2 | 6/2012 | Park et al. |
| 8,215,103 | B2 | 7/2012 | Hill |
| 8,240,137 | B2 | 8/2012 | Liu et al. |
| 8,272,777 | B2 | 9/2012 | Kohrs et al. |
| 8,302,383 | B2 | 11/2012 | Oesterle et al. |
| 8,375,709 | B2 | 2/2013 | Salanta et al. |
| 8,468,813 | B2 | 6/2013 | Hill et al. |
| 8,621,846 | B2 | 1/2014 | Thomas |
| 8,677,738 | B2 | 3/2014 | Floyd et al. |
| 9,347,347 | B2 | 5/2016 | Shin |
| 2002/0001554 | A1 | 1/2002 | Czarnik et al. |
| 2003/0159414 | A1* | 8/2003 | Cheng ................ B01D 46/0043 55/418 |
| 2003/0226412 | A1 | 12/2003 | Rumminger et al. |
| 2006/0070374 | A1 | 4/2006 | Gaiser et al. |
| 2007/0101703 | A1* | 5/2007 | Kanaya .............. B01D 53/9431 60/286 |
| 2008/0083218 | A1 | 4/2008 | Abram et al. |
| 2008/0134671 | A1 | 6/2008 | Nefischer |
| 2008/0245063 | A1 | 10/2008 | Hill |
| 2009/0019842 | A1 | 1/2009 | Suzuki et al. |
| 2009/0019843 | A1 | 1/2009 | Levin et al. |
| 2009/0179087 | A1 | 7/2009 | Martin et al. |
| 2009/0241906 | A1 | 10/2009 | Osbat et al. |
| 2009/0262599 | A1 | 10/2009 | Kohrs et al. |
| 2009/0266064 | A1* | 10/2009 | Zheng ................. B01F 3/04049 60/317 |
| 2010/0005790 | A1 | 1/2010 | Zhang |
| 2010/0005791 | A1 | 1/2010 | Ranganathan et al. |
| 2010/0107614 | A1 | 5/2010 | Levin et al. |
| 2010/0170232 | A1 | 7/2010 | Whitten et al. |
| 2010/0212292 | A1 | 8/2010 | Rusch et al. |
| 2010/0263359 | A1 | 10/2010 | Haverkamp et al. |
| 2011/0061969 | A1 | 3/2011 | Hill et al. |
| 2011/0107750 | A1* | 5/2011 | Kowada ............... B01D 53/944 60/299 |
| 2011/0239631 | A1* | 10/2011 | Bui ....................... F01N 3/2066 60/295 |
| 2011/0258983 | A1 | 10/2011 | Vosz |
| 2012/0151902 | A1* | 6/2012 | Yi ......................... F01N 3/2066 60/301 |
| 2012/0227390 | A1* | 9/2012 | Wikaryasz ................ F01N 3/20 60/324 |
| 2013/0164182 | A1 | 6/2013 | Iijima et al. |
| 2013/0170973 | A1 | 7/2013 | Staskowiak et al. |
| 2013/0188444 | A1 | 7/2013 | Palmer et al. |
| 2015/0040537 | A1 | 2/2015 | Hicks et al. |
| 2015/0044103 | A1 | 2/2015 | Sampath et al. |

FOREIGN PATENT DOCUMENTS

| | | | | |
|---|---|---|---|---|
| DE | 102005052064 | A1 | | 5/2007 |
| DE | 102016000442 | A1 | | 7/2016 |
| EP | 0711609 | A2 | | 5/1996 |
| EP | 1111231 | A2 | | 6/2001 |
| EP | 2168672 | A1 | | 3/2010 |
| EP | 2342434 | A1 | | 7/2011 |
| EP | 2580440 | A1 | | 4/2013 |
| EP | 02841726 | A1 | | 3/2015 |
| FR | 2807336 | A1 | | 10/2001 |
| JP | 11-166410 | | | 6/1999 |
| JP | 11166410 | A | * | 6/1999 |
| JP | 2003-328735 | A | | 11/2003 |
| JP | 2004324585 | A | | 11/2004 |
| JP | 2007332797 | A | | 12/2007 |
| JP | 4930796 | B2 | | 5/2012 |
| WO | WO-2007/110575 | A1 | | 10/2007 |
| WO | WO-2008061593 | A1 | | 5/2008 |
| WO | WO-2008/080695 | A1 | | 7/2008 |

* cited by examiner

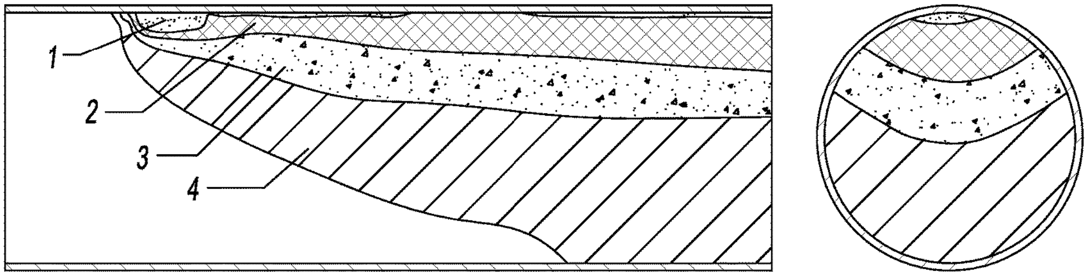

Mass Fraction of Reagent ( No Flow Modifier )

Fig-5

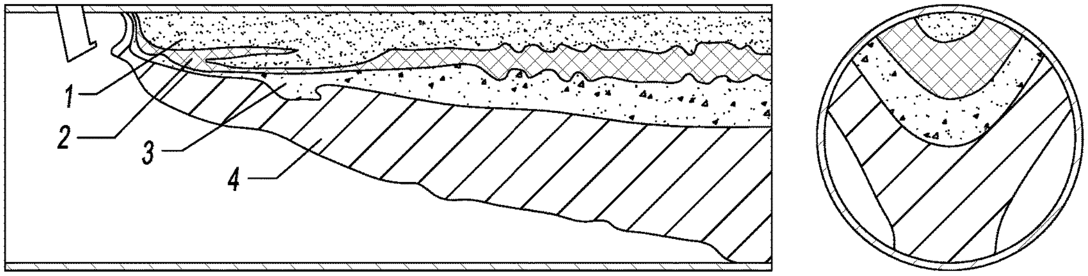

Mass Fraction of Reagent ( With Flow Modifier )

Fig-7

Area 1 ( $6.4 \times 10^{-4}$ - $8.0 \times 10^{-4}$ )
Area 2 ( $5.2 \times 10^{-4}$ - $6.4 \times 10^{-4}$ )
Area 3 ( $3.2 \times 10^{-4}$ - $5.2 \times 10^{-4}$ )
Area 4 ( $1.2 \times 10^{-4}$ - $3.2 \times 10^{-4}$ )

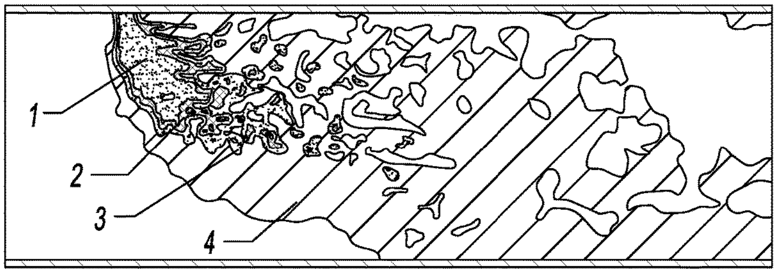

Fig-6

Simulated Spray Concentration of Droplets ( No Flow Modifier )

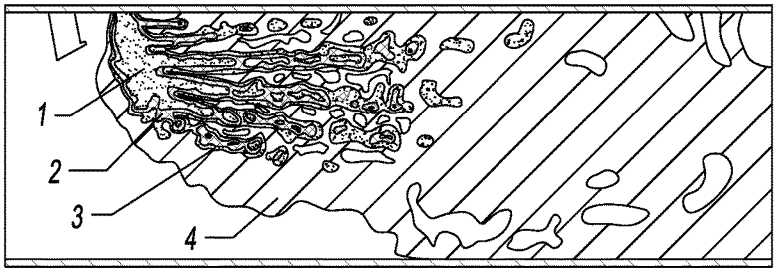

Fig-8

Simulated Spray Concentration of Droplets ( With Flow Modifier )

Area 1 ( $8.5 \times 10^{-3}$ - $1.0 \times 10^{-2}$ )
Area 2 ( $6.5 \times 10^{-3}$ - $8.5 \times 10^{-3}$ )
Area 3 ( $4.0 \times 10^{-3}$ - $6.5 \times 10^{-3}$ )
Area 4 ( $1.0 \times 10^{-3}$ - $4.0 \times 10^{-3}$ )

IN-LINE FLOW DIVERTER

CROSS-REFERENCE TO RELATED APPLICATIONS

This application is a continuation-in-part of U.S. patent application Ser. No. 14/193,499 filed on Feb. 28, 2014, which is a continuation-in-part of U.S. patent application Ser. No. 13/227,952 filed on Sep. 8, 2011, now issued as U.S. Pat. No. 8,677,738 on Mar. 25, 2014. The entire disclosures of the above applications are incorporated herein by reference.

FIELD

The present disclosure relates to exhaust gas treatment systems. More particularly, an exhaust gas flow modifier is provided upstream from a reagent injector to enhance mixing and distribution of the reagent within the engine exhaust stream.

BACKGROUND

This section provides background information related to the present disclosure which is not necessarily prior art.

To reduce the quantity of undesirable particulate matter and $NO_x$ emitted to the atmosphere during internal combustion engine operation, a number of exhaust aftertreatment systems have been developed. The need for exhaust aftertreatment systems particularly arises when diesel combustion processes are implemented.

One method used to reduce $NO_x$ emissions from internal combustion engines is known as selective catalytic reduction (SCR). SCR may include injecting a reagent into the exhaust stream of the engine to form a reagent and exhaust gas mixture that is subsequently passed through a reactor containing a catalyst, such as, activated carbon, or metals, such as platinum, vanadium, or tungsten, which are capable of reducing the $NO_x$ concentration in the presence of the reagent.

An aqueous urea solution is known to be an effective reagent in SCR systems for diesel engines. However, use of an aqueous solution and other reagents may include disadvantages. Urea is highly corrosive and attacks mechanical components of the SCR system. Urea also tends to solidify upon prolonged exposure to high temperatures, such as encountered in diesel exhaust systems. A concern exists because the reagent that creates a deposit is not used to reduce the $NO_x$.

In addition, if the reagent is not properly mixed with the exhaust gas, the reagent is not efficiently utilized, inhibiting the action of the catalyst and thereby reducing the SCR system's effectiveness. High reagent injection pressures have been used as a method of minimizing the problem of insufficient atomization of the urea mixture. However, high injection pressures may result in over-penetration of the injected spray plume into the exhaust stream thereby causing the plume to impinge on the inner surface of the exhaust pipe opposite the injector. Over-penetration leads to inefficient use of the urea mixture and may reduce the range over which the vehicle may be operated with reduced $NO_x$ emissions. Only a finite amount of reagent may be carried in a vehicle. It is desirable to efficiently use the stored reagent to maximize vehicle range and reduce the need for replenishing the reagent.

It may be advantageous to provide methods and apparatus for injecting a reagent into the exhaust stream of an internal combustion engine to minimize reagent deposition and improve the mixing of the reagent with the exhaust gas.

SUMMARY

This section provides a general summary of the disclosure, and is not a comprehensive disclosure of its full scope or all of its features.

An exhaust gas treatment system for reducing emissions from an engine includes an exhaust conduit adapted to supply an exhaust stream from the engine to an exhaust treatment device. The conduit includes an aperture. An injector injects a reagent through the aperture and into the exhaust stream. A flow modifier is positioned within the exhaust conduit upstream of the injector. The flow modifier includes a diverter for increasing the velocity of the exhaust gas at a predetermined location within the conduit relative to the injected reagent.

An exhaust gas stream flow modifier is provided for an exhaust gas treatment system including an exhaust conduit and an injector for injecting a reagent into an exhaust stream. The flow modifier includes a mount adapted to fix the injector to the conduit. The mount includes an aperture through which reagent is injected. A diverter is coupled to one of the mount and the conduit, adapted to be positioned within the conduit, and offset from an inner surface of the conduit. The diverter is positioned upstream from the reagent injection aperture and inclined at an angle to increase a velocity of the exhaust at a predetermined location within the conduit to reduce reagent impingement on the conduit inner surface.

The present disclosure also provides an exhaust gas treatment system for reducing emissions from an engine. The system includes an exhaust treatment device; an exhaust conduit adapted to supply an exhaust stream from the engine to the exhaust treatment device, the conduit including an aperture; an injector for injecting a reagent through the aperture and into the exhaust stream; and a flow modifier positioned within the exhaust conduit proximate the injector. The flow modifier includes a plate having a first end and a second end that are fixed to opposing sides of the exhaust conduit to suspend the plate within the exhaust conduit, and the plate includes a plurality of louvers that direct the exhaust stream in a direction toward or away from the injector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 5 depicts a computational fluid dynamics model of the mass fraction of reagent in a conduit without a flow modifier FIG. 6 is a computational fluid dynamics contour depicting a simulated spray concentration of droplets for reagent injected within a conduit without a pre-injection exhaust flow modifier;

FIG. 7 depicts a computational fluid dynamics model of the mass fraction of reagent in a conduit with a flow modifier;

FIG. 8 is a computational fluid dynamics contour depicting a simulated spray concentration of droplets for reagent injected within a conduit with a pre-injection exhaust flow modifier;

Figure 33:
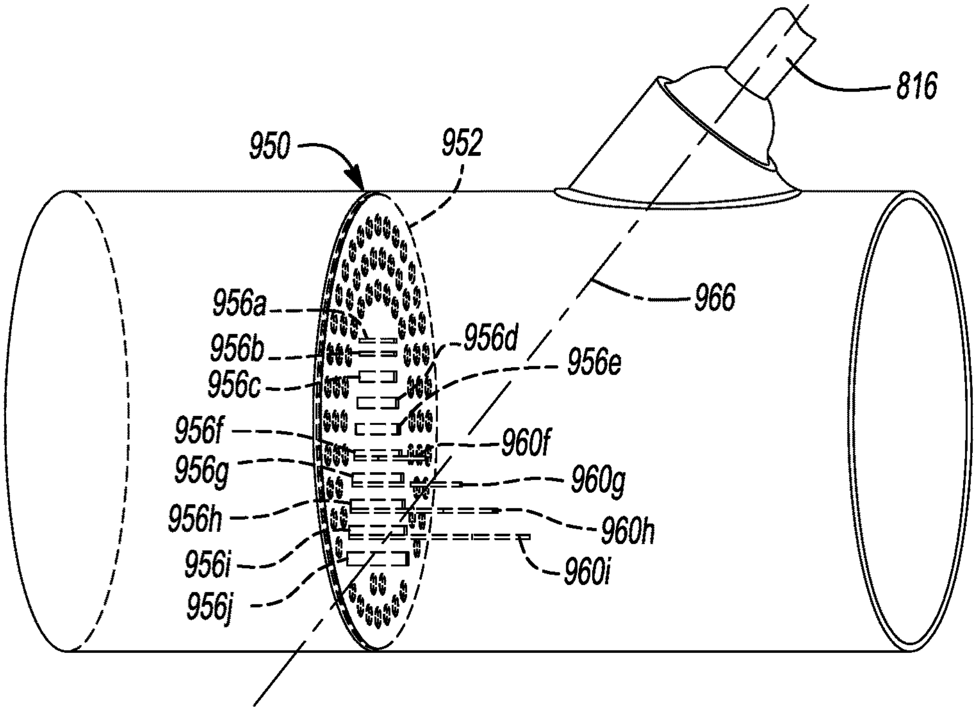
Figure 34:
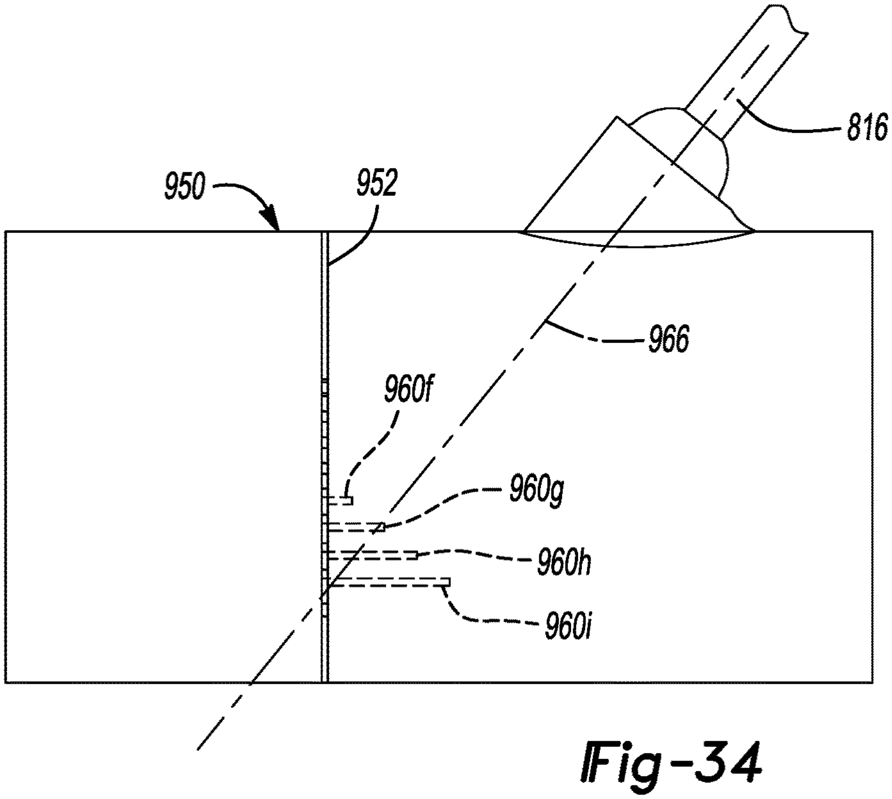
Figure 35:
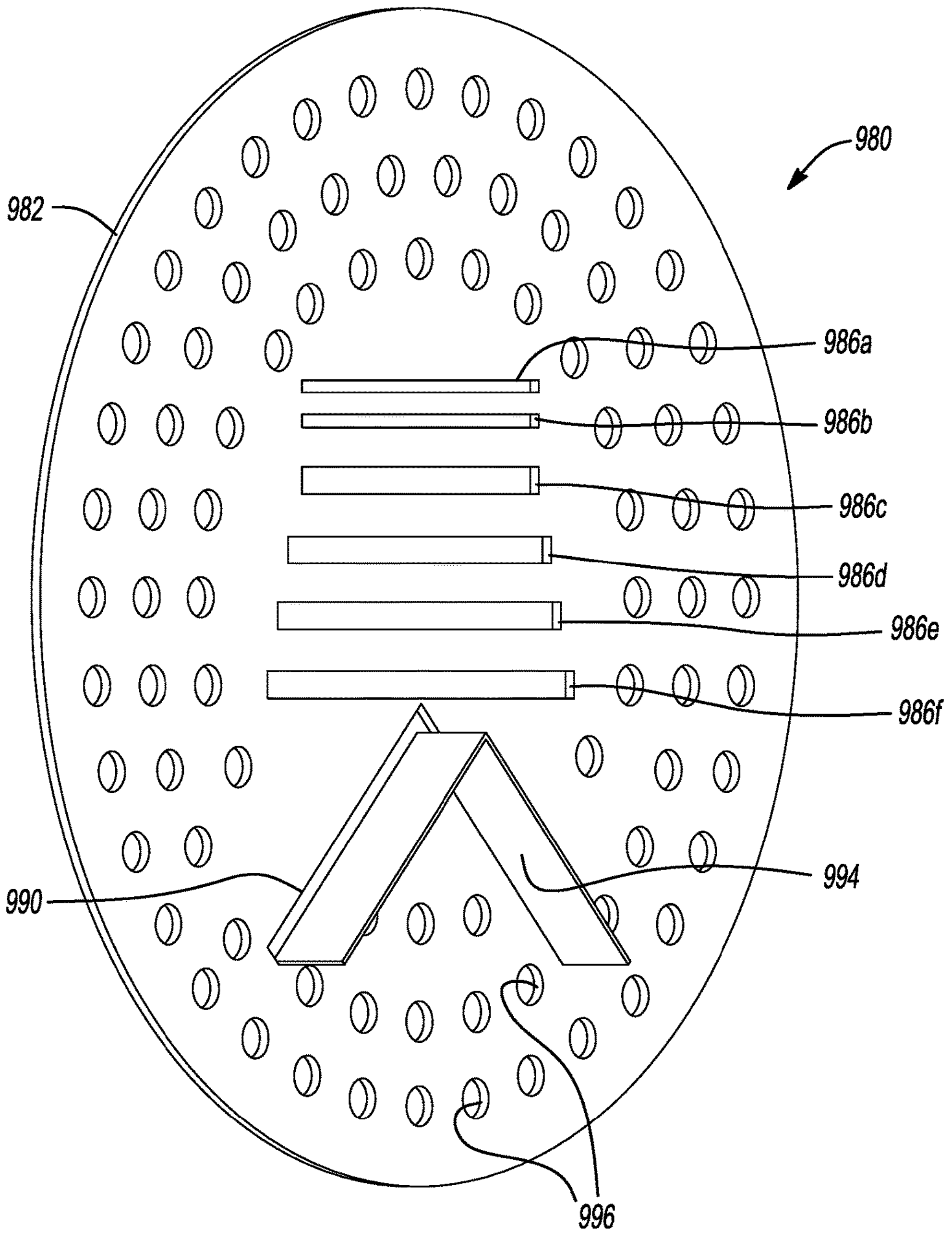

FIGS. 27-32 provide front view of alternate flow modifiers;

FIG. 33 is a fragmentary perspective view of another alternate flow modifier;

FIG. 34 is a fragmentary cross-sectional side view of the flow modifier depicted in FIG. 33; and FIG. 35 is a perspective view of another alternate flow modifier.

Corresponding reference numerals indicate corresponding parts throughout the several views of the drawings.

DETAILED DESCRIPTION

Example embodiments will now be described more fully with reference to the accompanying drawings.

It should be understood that although the present teachings may be described in connection with diesel engines and the reduction of $NO_x$ emissions, the present teachings can be used in connection with any one of a number of exhaust streams, such as, by way of non-limiting example, those from diesel, gasoline, turbine, fuel cell, jet or any other power source outputting a discharge stream. Moreover, the present teachings may be used in connection with the reduction of any one of a number of undesired emissions. For example, injection of hydrocarbons for the regeneration of diesel particulate filters is also within the scope of the present disclosure. For additional description, attention should be directed to commonly-assigned U.S. Pat. No. 8,047,452, issued Nov. 1, 2011, entitled "Method And Apparatus For Injecting Atomized Fluids", which is incorporated herein by reference.

Figure 1:
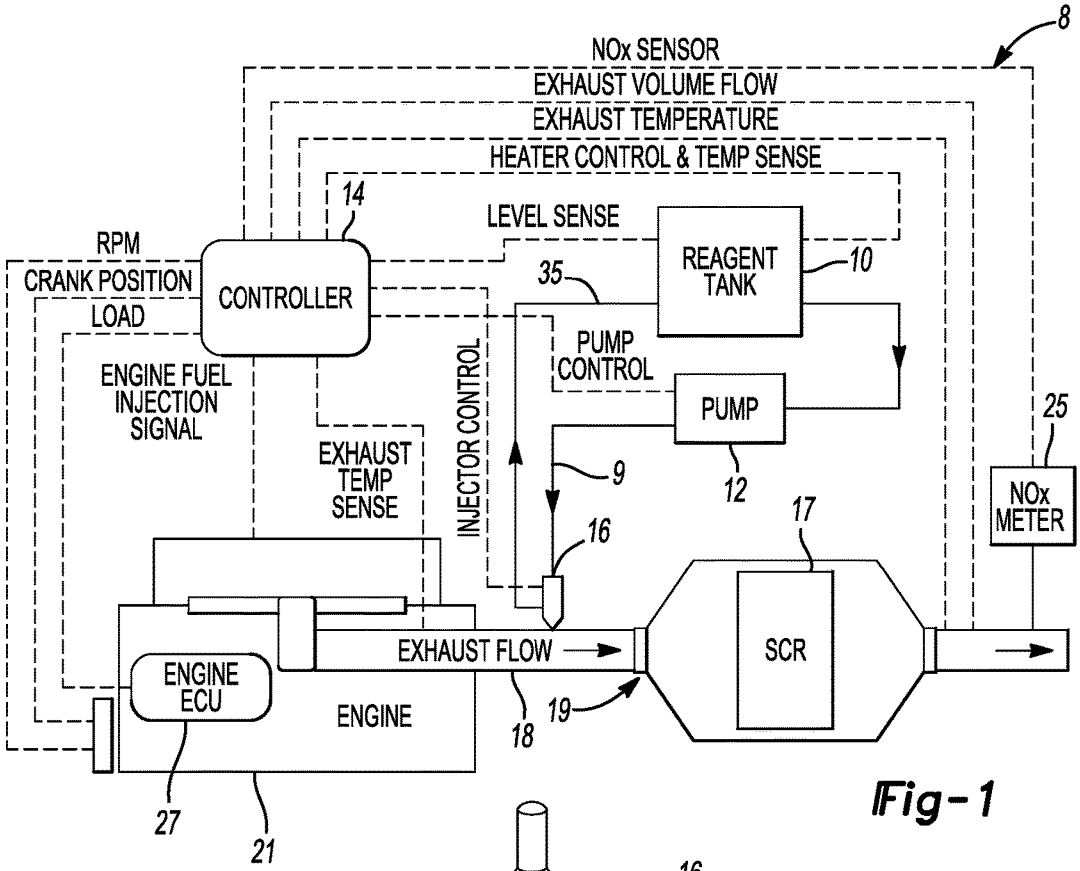
FIG. 1 depicts a schematic diagram of an exemplary internal combustion engine with an emissions control system equipped with a pre-injection exhaust flow modifier according to the present teachings.
Figure 2:
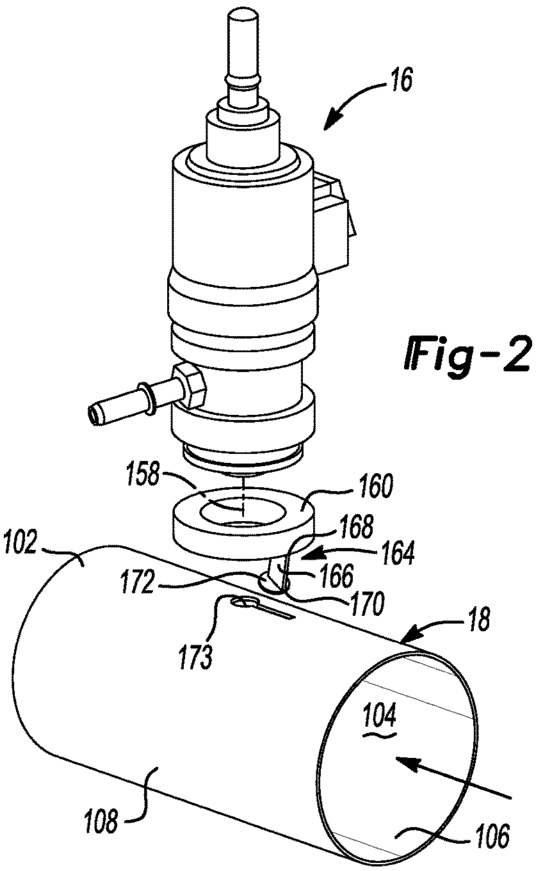
FIG. 2 is an exploded perspective view of an exhaust gas treatment device including a pre-injection exhaust flow modifier.

With reference to the Figures, a pollution control system 8 for reducing $NO_x$ emissions from the exhaust of a diesel engine 21 is provided. In FIG. 1, solid lines between the elements of the system denote fluid lines for reagent and dashed lines denote electrical connections. The system of the present teachings may include a reagent tank 10 for holding the reagent and a delivery module 12 for delivering the reagent from the tank 10. The reagent may be a urea solution, a hydrocarbon, an alkyl ester, alcohol, an organic compound, water, or the like and can be a blend or combination thereof. It should also be appreciated that one or more reagents can be available in the system and can be used singly or in combination. The tank 10 and delivery module 12 may form an integrated reagent tank/delivery module. Also provided as part of system 8 is an electronic injection controller 14, a reagent injector 16, and an exhaust system 19. Exhaust system 19 includes an exhaust conduit 18 providing an exhaust stream to at least one catalyst bed 17.

The delivery module 12 may comprise a pump that supplies reagent from the tank 10 via a supply line 9. The reagent tank 10 may be polypropylene, epoxy coated carbon steel, PVC, or stainless steel and sized according to the application (e.g., vehicle size, intended use of the vehicle, and the like). A pressure regulator (not shown) may be provided to maintain the system at predetermined pressure setpoint (e.g., relatively low pressures of approximately 60-80 psi, or in some embodiments a pressure of approximately 60-150 psi) and may be located in the return line 35 from the reagent injector 16. A pressure sensor may be provided in the supply line 9 leading to the reagent injector 16. The system may also incorporate various freeze protection strategies to thaw frozen reagent or to prevent the reagent from freezing. During system operation, regardless of whether or not the injector is releasing reagent into the exhaust gases, reagent may be circulated continuously between the tank 10 and the reagent injector 16 to cool the injector and minimize the dwell time of the reagent in the injector so that the reagent remains cool. Continuous reagent circulation may be necessary for temperature-sensitive reagents, such as aqueous urea, which tend to solidify upon exposure to elevated temperatures of 300° C. to 650° C. as would be experienced in an engine exhaust system.

Furthermore, it may be desirable to keep the reagent mixture below 140° C. and preferably in a lower operating range between 5° C. and 95° C. to ensure that solidification of the reagent is prevented. Solidified reagent, if allowed to form, may foul the moving parts and openings of the injector.

The amount of reagent required may vary with load, exhaust gas temperature, exhaust gas flow, engine fuel injection timing, desired $NO_x$ reduction, barometric pressure, relative humidity, EGR rate and engine coolant temperature. A $NO_x$ sensor or meter 25 is positioned downstream from catalyst bed 17. $NO_x$ sensor 25 is operable to output a signal indicative of the exhaust $NO_x$ content to an engine control unit 27. All or some of the engine operating parameters may be supplied from engine control unit 27 via the engine/vehicle databus to the reagent electronic injection controller 14. The reagent electronic injection controller 14 could also be included as part of the engine control unit 27. Exhaust gas temperature, exhaust gas flow and exhaust back pressure and other vehicle operating parameters may be measured by respective sensors.

Referring now to FIGS. 2-8, an exhaust gas treatment assembly 100 is defined to include exhaust conduit 18 and injector 16. Exhaust conduit 18 includes a substantially cylindrical tube 102 defining an exhaust passageway 104. Cylindrical tube 102 includes an inner surface 106 and an outer surface 108.

Injector 16 includes a body 150 defining a cylindrical chamber 152 in receipt of an axially translatable valve member 154. Body 150 includes an exit orifice 156 as a discharge location for injected reagent. A valve seat 146 is formed proximate exit orifice 156 that is selectively engaged by valve member 154 to control reagent injection into the exhaust gas flow path. Valve member 154 is translatable along an axis of reagent injection 158.

A mount 160 is fixed to body 150 and includes a radially outwardly extending flange 162. A flow modifier 164 radially inwardly extends from mount 160 into tube 102 to change the direction of exhaust flow through exhaust passageway 104. A clamp (not shown) or some other suitable coupling device fixes mount 160 to tube 102.

Flow modifier 164 includes a radially inwardly extending post 166 having a first end 168 fixed to mount 160 and an opposite end 170 fixed to a substantially planar diverter plate 172. Diverter plate 172 is positioned at an inclined angle to a direction of exhaust flow passing through tube 102. In the embodiment depicted in FIG. 2, diverter plate 172 includes an elongated oval outer shape.

Flow modifier 164 and mount 160 are shown as a one-piece member that may easily be fixed to tube 102 using typical injector mounting hardware. It is also contemplated that flow modifier 164 may be spaced apart from mount 160, positioned within exhaust passageway 104, and separately fixed to cylindrical tube 102. In the version depicted in FIG. 2, tube 102 includes a keyhole slot 173 shaped to receive flow modifier 164.

Figure 3:
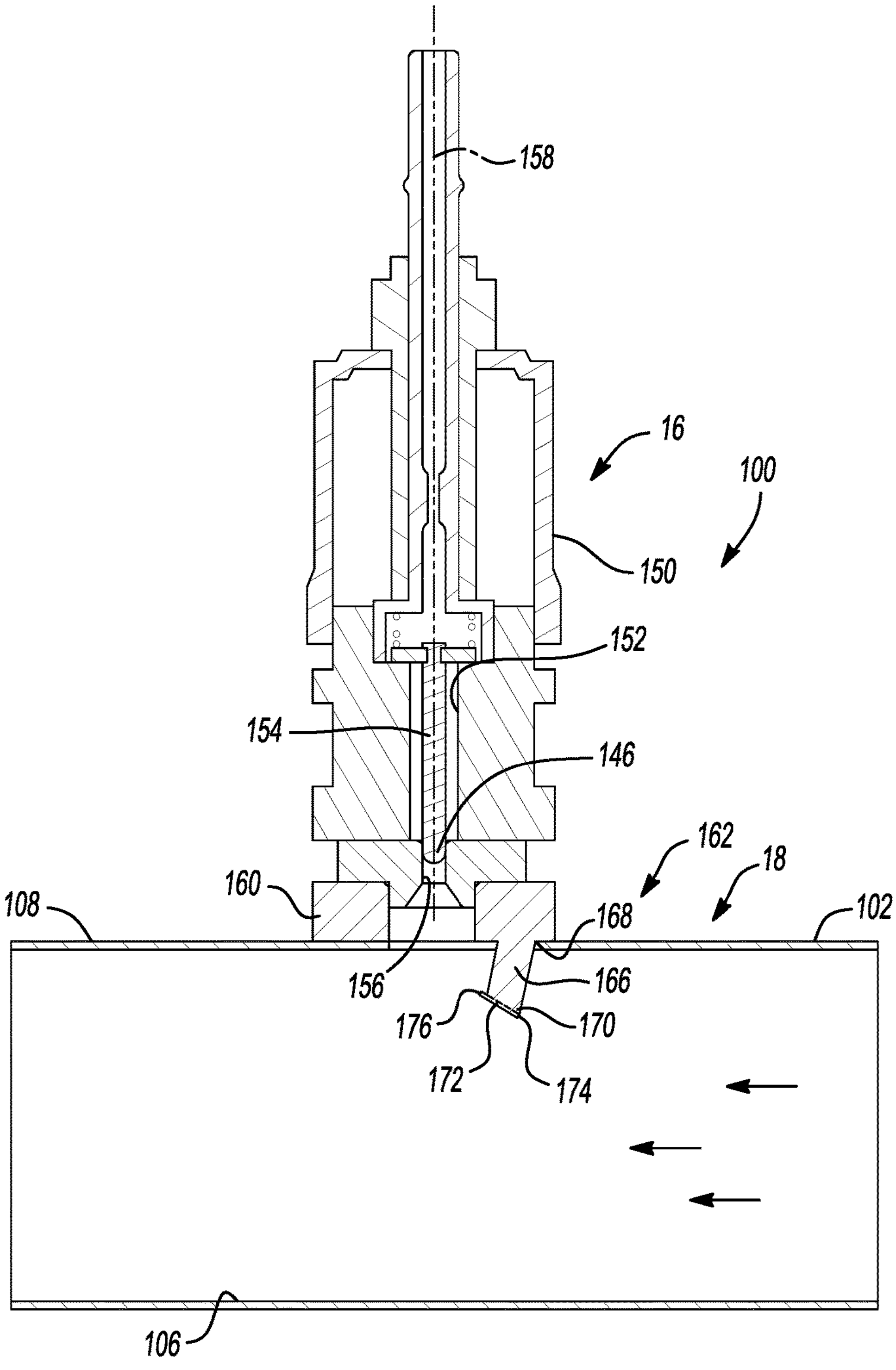
FIG. 3 is a fragmentary cross-sectional side view of the exhaust gas treatment device.
Figure 4:
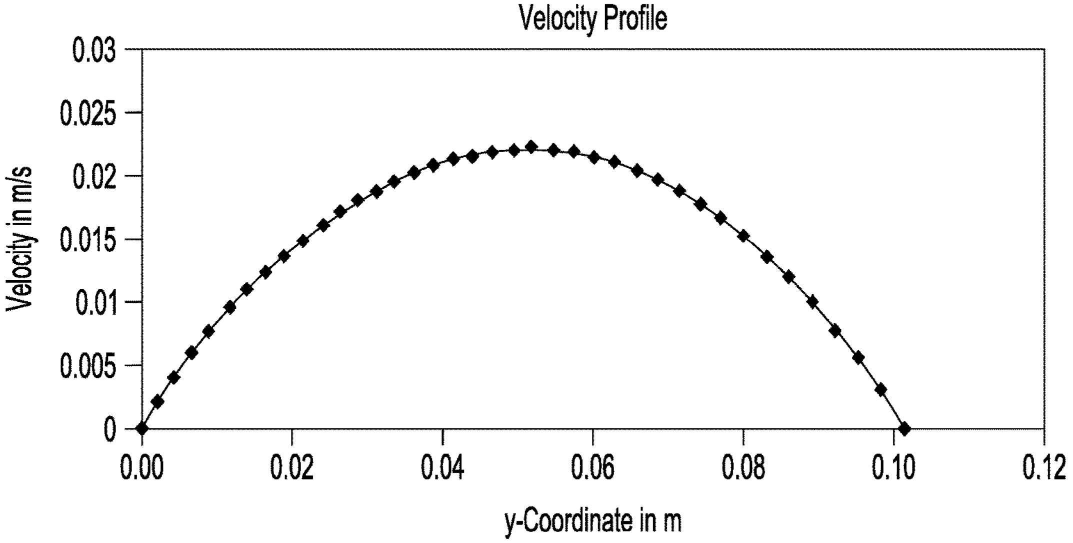
FIG. 4 is a graph depicting an exhaust gas velocity profile through a conduit that is not equipped with a pre-injection modifier.

Flow modifier 164 is positioned upstream from axis of reagent injection 158. Flow modifier 164 is sized, shaped and positioned within passageway 104 to change the velocity profile of the exhaust at a cross-sectional plane taken along reagent injection axis 158. In the absence of a flow modifier, the exhaust flow velocity profile flowing through tube 102 exhibits a substantially symmetrical curved trace increasing to a maximum velocity at the center of passageway 104 with minimal velocity at inner surface 106, as shown in FIG. 4. The velocity of the exhaust gas near inner surface 106 is substantially lower than the exhaust gas velocity in the center of tube 102. When the exhaust flow rate is relatively low, such as when the internal combustion engine is idling, injected reagent tends to pass through the exhaust gas and impinge on inner surface 106 along the lower half of tube 102 (FIG. 3). As previously mentioned, it is desirable to mix the reagent with the exhaust gas and supply the mixture to an exhaust treatment device such as an SCR catalyst. Reagent that impinges on inner surface 106 may tend to adhere to tube 102 causing undesirable pooling, corrosion and possible reagent solidification.

FIG. 5 depicts a computational fluid dynamics contour illustrating a reagent mass fraction distribution during an injection of approximately 4.2 grams per minute with a relatively low exhaust flow rate of approximately 380 kg per hour for an exhaust system without a flow modifier. A simulated reagent spray concentration contour plot is also provided at FIG. 6 for the same exhaust flow rate and reagent injection rate. Both of the plots of FIGS. 5 and 6 relate to exhaust flow and reagent injection within a cylindrical tube without a flow modifier.

FIG. 7 depicts a mass fraction of reagent contour for the same exhaust flow and reagent injection rates for a system equipped with a flow modifier shaped as diverter plate 172. A corresponding reagent spray concentration contour is shown at FIG. 8. A comparison of the contours generated without a flow diverter and the contours including diverter plate 172 illustrate the effect of increasing the exhaust velocity near reagent exit orifice 156. By increasing the velocity at the area where the reagent is initially injected, droplets of reagent are forced upwardly and/or further downstream prior to traversing the tube and impinging inner surface 106 opposite injector 16.

Additional computational estimates were generated regarding the concentration of injected reagent throughout passageway 106. In particular, an amount of reagent deposited on the lower half of the pipe wall surface was estimated at the 380 kg per hour exhaust flow rate with the reagent injection rate of approximately 4.2 g per minute. By installing flow modifier 164, the mass fraction of reagent deposited on the lower half of inner surface 106 was reduced more than 50 percent.

Further review of the computational fluid dynamics data reflects diverter plate 172 causing a flow separation at a leading edge 174 urging the exhaust flow to accelerate toward injector 16. At a trailing edge 176 of diverter plate 172 the exhaust flow velocity is increased by 25 percent in the area between diverter plate 172 and injector 16. Enhanced mixing and reduced reagent impingement results.

Figure 9:
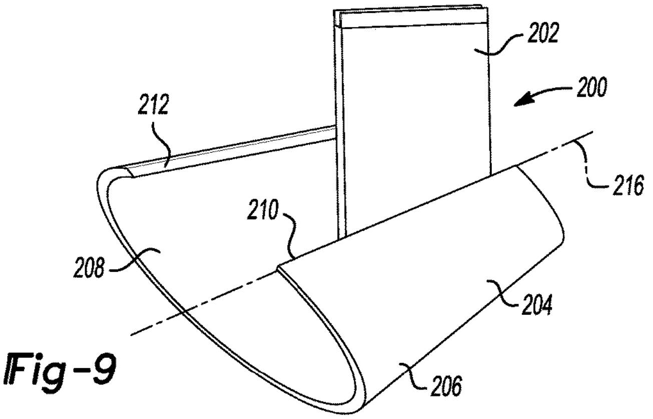
FIG. 9 is fragmentary perspective view of a semi-cone flow modifier.

FIG. 9 depicts an alternate flow modifier 200. As previously discussed in relation to flow modifier 164, flow modifier 200 may be fixed to an injector mount or may be separately spaced apart from injector 16 and coupled to tube 102. Flow modifier 200 includes a post 202 having a substantially planar shape radially extending into passageway 104. A semi-cone flap 204 is fixed to post 202. Semi-cone flap 204 includes a partially conically shaped outer surface 206 spaced apart from a partially conically shaped inner surface 208. Semi-cone flap 204 terminates at a first edge 210 and a second edge 212. First edge 210 is spaced apart from second edge 212 to allow post 202 to pass therebetween. An axis of rotation 216 of outer conical surface 206 extends at an angle to the direction of exhaust flow through passageway 104 to increase the velocity of the exhaust flow near injector 16. CFD analysis indicates favorable reagent and exhaust mixing as well as reduced reagent impingement on inner surface 106 opposite injector 16.

Figure 10:
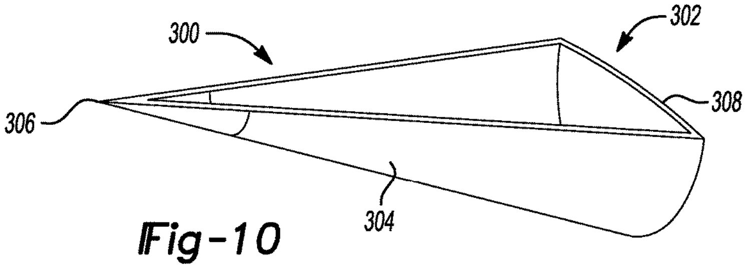
FIG. 10 is fragmentary perspective view of a wedge flap flow modifier.

Another alternate flow modifier is identified at reference numeral 300 as shown in FIG. 10. Flow modifier 300 includes a wedge-shaped flap 302 inwardly protruding from inner surface 106 upstream from injector 16. Wedge flap 302 includes a conically shaped wall 304 beginning at a point 306 and terminating at a substantially planar panel 308. Wedge flap 302 also serves to modify the exhaust gas velocity profile upstream from injector 16 to enhance mixing and reduce reagent impingement on inner surface 106.

Figure 11:
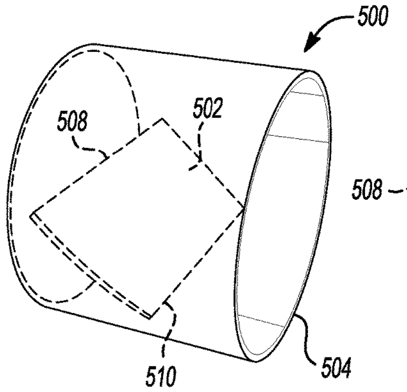
FIG. 11 is fragmentary perspective view of another alternate pre-injection flow modifier.
Figure 12:
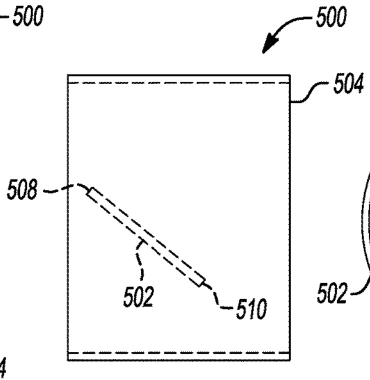
FIG. 12 is cross-sectional side view of the flow modifier depicted in FIG. 11.
Figure 13:
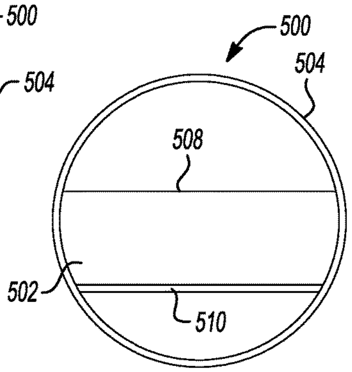
FIG. 13 is an end view of the flow modifier depicted in FIG. 11.

FIGS. 11-13 depict another type of flow modifier identified at reference numeral 500. Flow modifier 500 is shaped as a substantially planar plate 502 fixed within a substantially cylindrical tube 504. Plate 502 is inclined in the opposite direction than that of diverter plate 172. In particular, an upstream edge 508 of plate 502 is positioned closer to injector 16 than a downstream edge 510 of plate 502. Exhaust flow is split as it traverses leading edge 508 such that the top portion of the flow will expand and slow down slightly, while the bottom portion of the flow will compress and cause an increase in velocity. The increased velocity at the lower portion of the pipe will sweep away reagent droplets reaching the lower portion of the pipe before evaporating. Accordingly, flow modifier 500 will reduce pipe wetting due to reagent impingement.

Provided that the angle at which plate 502 resides within tube 504 is steep enough, the top portion of the pipe will experience boundary layer detachment causing turbulence to assist reagent and exhaust mixing. In one embodiment, a post injection mixer such as that depicted in U.S. Pat. No. 8,141,353, which is hereby incorporated by reference, may be included. The turbulent flow entering the mixer will enhance the mixer's ability to distribute the reagent throughout the exhaust gas. As such, the mixing length may be shortened. Alternatively, by properly positioning plate 502 upstream from injector 16, a post injection mixer may be eliminated.

Figure 14:
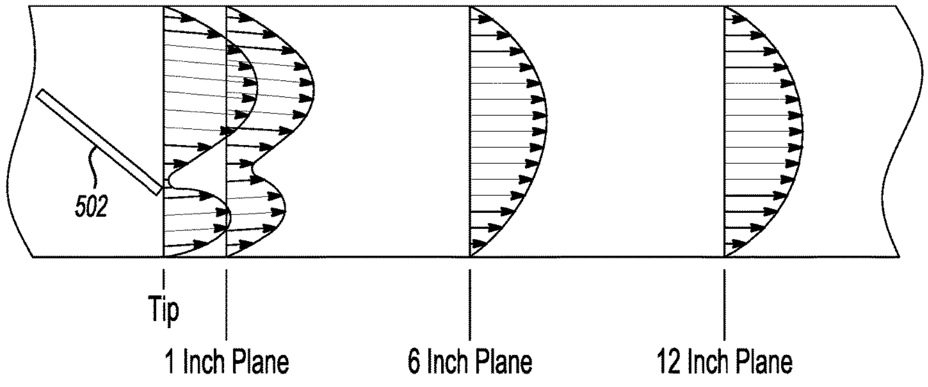
FIG. 14 is a graph depicting a velocity profile for the exhaust travelling through a conduit equipped with the flow modifier shown in FIG. 11.

FIG. 14 presents a velocity profile of the exhaust at four different axial positions downstream from inclined plate 502. The first velocity distribution is plotted at the trailing edge 510 of plate 502. The next profile to the right, as viewed in FIG. 14, depicts the exhaust gas velocity distribution at one inch axial distance downstream from trailing edge 520. The velocity distributions at a six inch offset distance and at a twelve inch offset distance are also shown. Based on the computational fluid dynamic modeling, injector 16 may be beneficially placed at an axial location aligned with trailing edge 510 or within approximately 1 inch of trailing edge 510 to take advantage of the increased velocity profile near inner surface 106 opposite injector 16.

It should also be appreciated that plate 502 may be fixed within tube 504 or may be moveably mounted therein. For the moveably mounted version, it is contemplated plate 502 may be pivotally coupled to tube 504 in a manner similar to the snap-action valve described in U.S. Pat. No. 7,434,570 herein incorporated by reference. Additional moveable valves are described in U.S. Pat. No. 7,775,322, U.S. Pat. No. 8,215,103 and U.S. Pat. No. 8,468,813 also herein incorporated by reference. Each of the references cited include a torsional spring and a passively actuated valve that rotates in relation to the pressure of the exhaust acting thereon. It is also contemplated that the present flow modifier may be actively controlled through the use of an actuator (not shown) operable to rotate plate 502 between a position substantially parallel to the direction of exhaust flow and the inclined position previously discussed.

Figure 15:
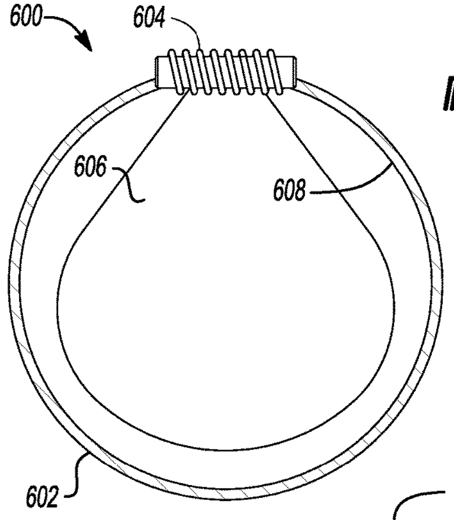
FIG. 15 is a plan view of another alternate flow modifier.
Figure 16:
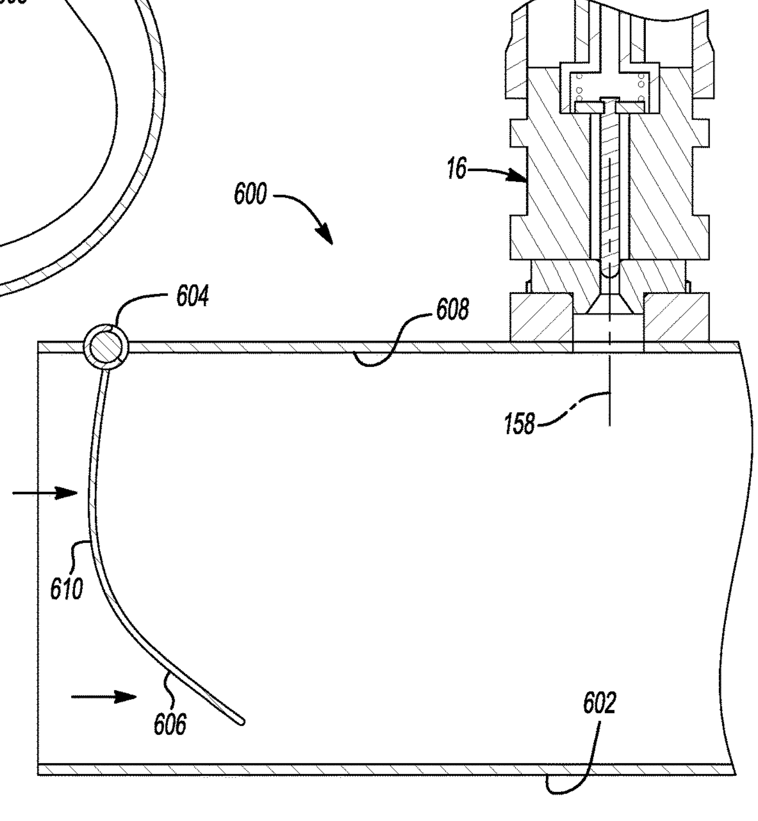
FIG. 16 is a fragmentary cross-sectional side view of the flow modifier shown in FIG. 15.

FIGS. 15 and 16 depict a biased flow modifier 600 pivotally coupled to tube 602. Flow modifier 600 may be moved between deployed and retracted positions to minimize restriction to flow at higher exhaust flow rates. When the exhaust flow rate through tube 602 is sufficiently high, additional flow modification is not required to obtain adequate reagent mixing and avoidance of reagent impingement. At these higher exhaust gas flow rates, it may be beneficial to retract the flow modifier from its deployed position.

A torsion spring 604 biases a flap 606 toward the deployed position depicted in the figures. Flap 606 is curved to deflect exhaust flow away from injector 16 and increase the exhaust velocity adjacent inner surface 608 opposite injector 16. When the exhaust flow rate reaches a predetermined magnitude, the force on an upstream surface 610 of flow modifier 600 overcomes the biasing force of spring 604, thereby causing flap 606 to move toward the retracted position adjacent inner surface 608. When flow modifier 600 is in the retracted position, restriction to exhaust flow is minimized. Any increase in back pressure due to the use of flow modifier 600 will be minimized.

Figure 17:
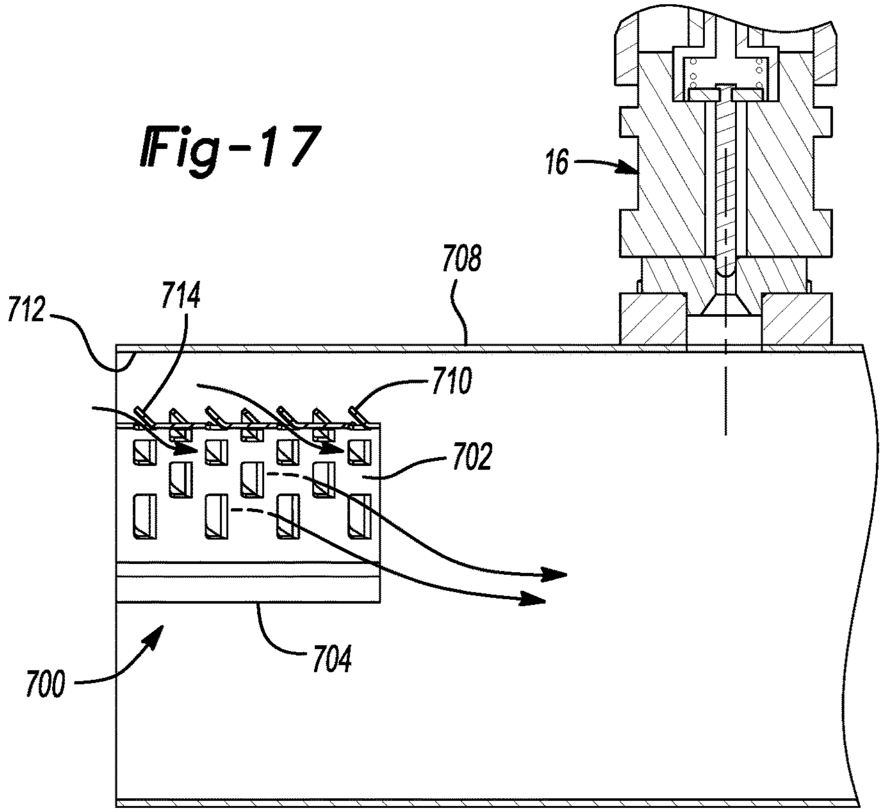
FIG. 17 is a fragmentary cross-sectional side view of an exhaust conduit including a flow modifier at an upper portion of the conduit according to a principle of the present disclosure.

FIG. 17 illustrates another flow modifier 700 according to a principle of the present disclosure. Flow modifier 700 is a curved plate 702 including a first edge 704 and a second edge 706 fixed to exhaust tube 708 such that plate 702 is suspended within exhaust tube 708 at a position located upstream from injector 16. Although plate 702 is illustrated as being curved, plate 702 may be substantially planar without departing from the scope of the present disclosure. A plurality of louvers 710 may be formed in plate 702 to direct the exhaust flow in a desired direction. In the illustrated embodiment, flow modifier is fixed to exhaust tube 708 at an upper portion 712 thereof (i.e., on the same side of tube 708 as injector 16). As the exhaust flow approaches flow modifier 700, louvers 710 will direct the exhaust flow in a downward direction away from injector 16. In this manner, droplets of the reagent exhaust treatment fluid may be prevented from reaching the lower portion 713 of tube 708 and pooling or forming deposits thereon.

Figure 18:
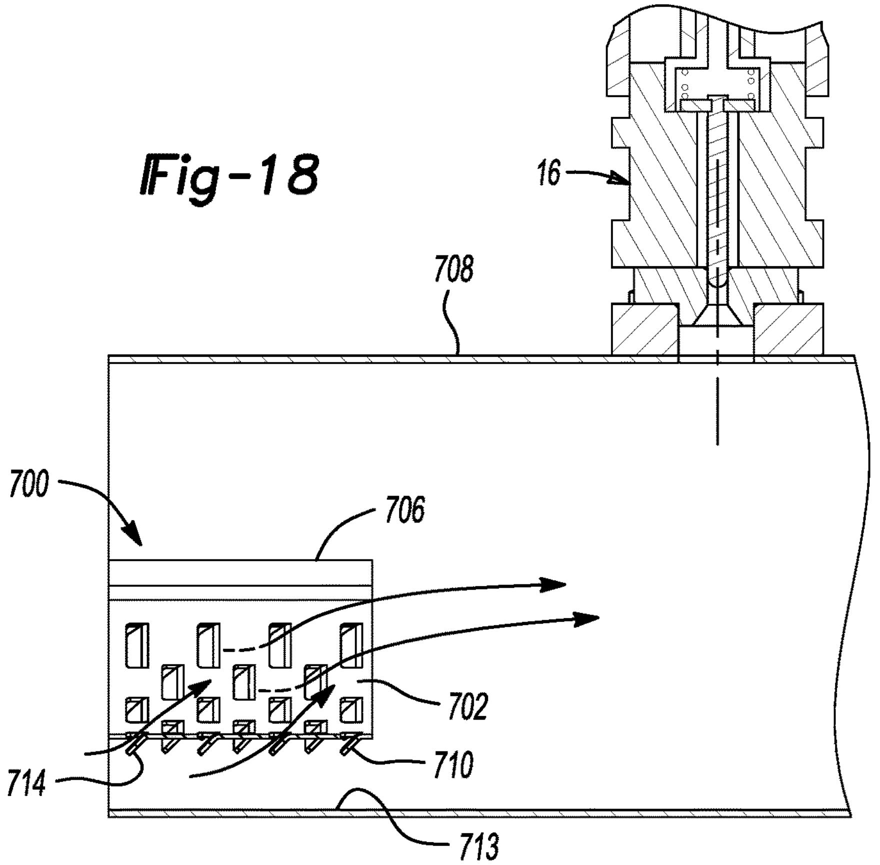
FIG. 18 is a fragmentary cross-sectional side view of an exhaust conduit including a flow modifier at a lower portion of the conduit according to a principle of the present disclosure.
Figure 19:
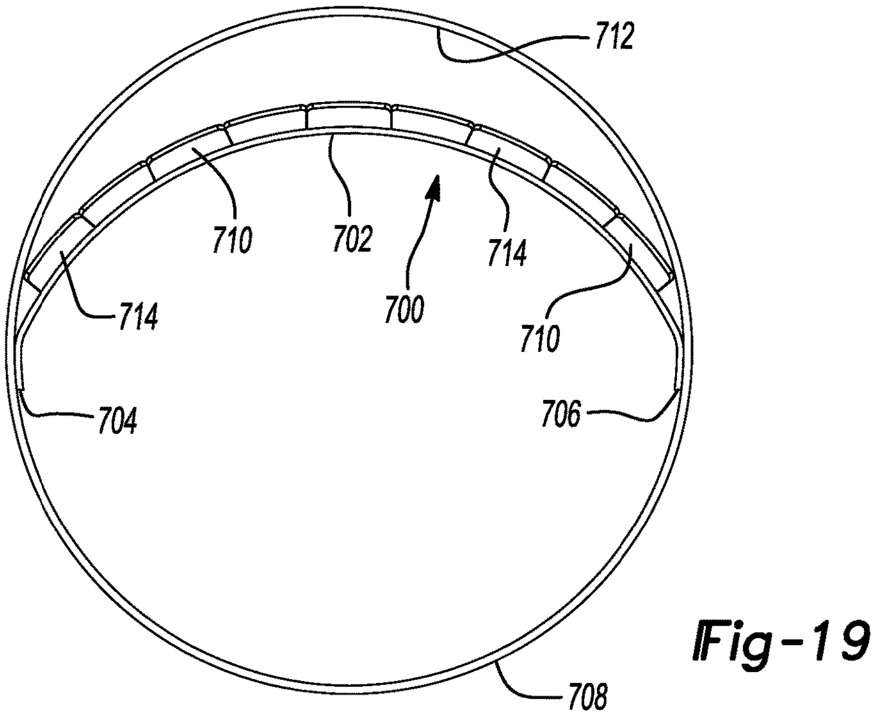
FIG. 19 is a front view of an exhaust conduit including the flow modifier illustrated in FIG. 17.

Alternatively, flow modifier 700 can be fixed to exhaust tube 708 at lower portion 713 thereof (FIG. 18). Louvers 710 will then direct the exhaust flow upward and toward the injector 16. Regardless where flow modifier 700 is positioned, the increase in velocity and swirl induced by louvers 710 will intermingle the reagent exhaust treatment fluid with the exhaust stream such that deposit formation is prevented, or at least substantially minimized. Further, it should be understood that flow modifier 700, whether positioned at upper portion 712 or lower portion 713, can include louvers 710 oriented in the opposite configuration as that illustrated. That is, when flow modifier 700 is positioned at upper portion 712 of tube 708, louvers 710 can be oriented to direct the exhaust flow toward the injector 16. Alternatively, when flow modifier 700 is positioned at lower portion 712 of tube 708, louvers 710 can be oriented to direct the exhaust flow away from injector 16. Another alternative is to have louvers 710 oriented in each direction, whether flow modifier 700 is positioned at either the upper portion 712 or lower portion 713 of tube 708.

Figure 20:
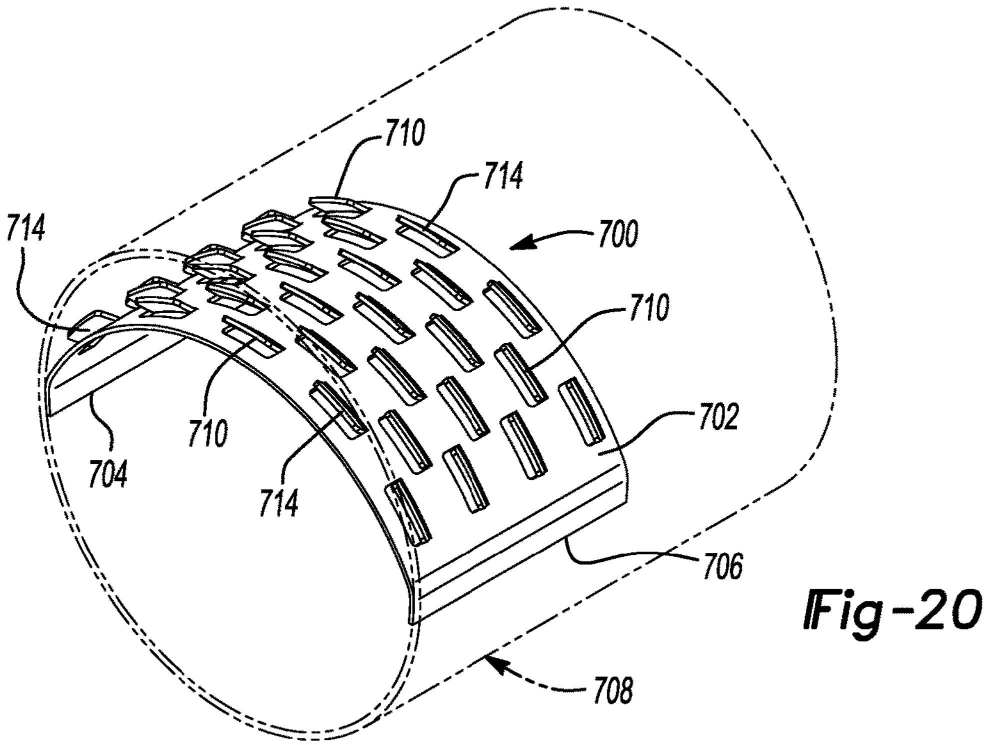
FIG. 20 is a perspective view of an exhaust conduit including the flow modifier illustrated in FIG. 17.
Figure 21:
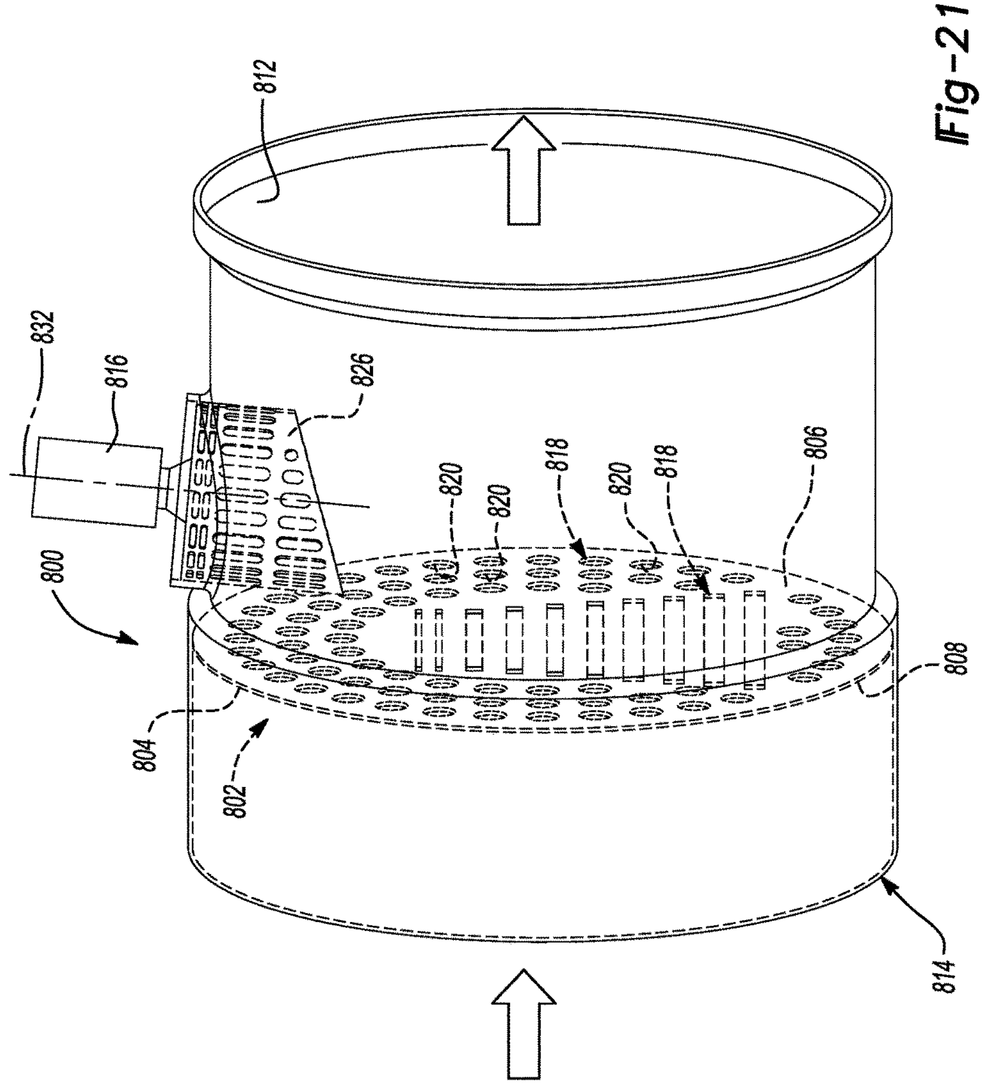
FIG. 21 is a perspective view of an exhaust system including another flow modifier constructed in accordance with the teachings of the present disclosure.
Figure 22:
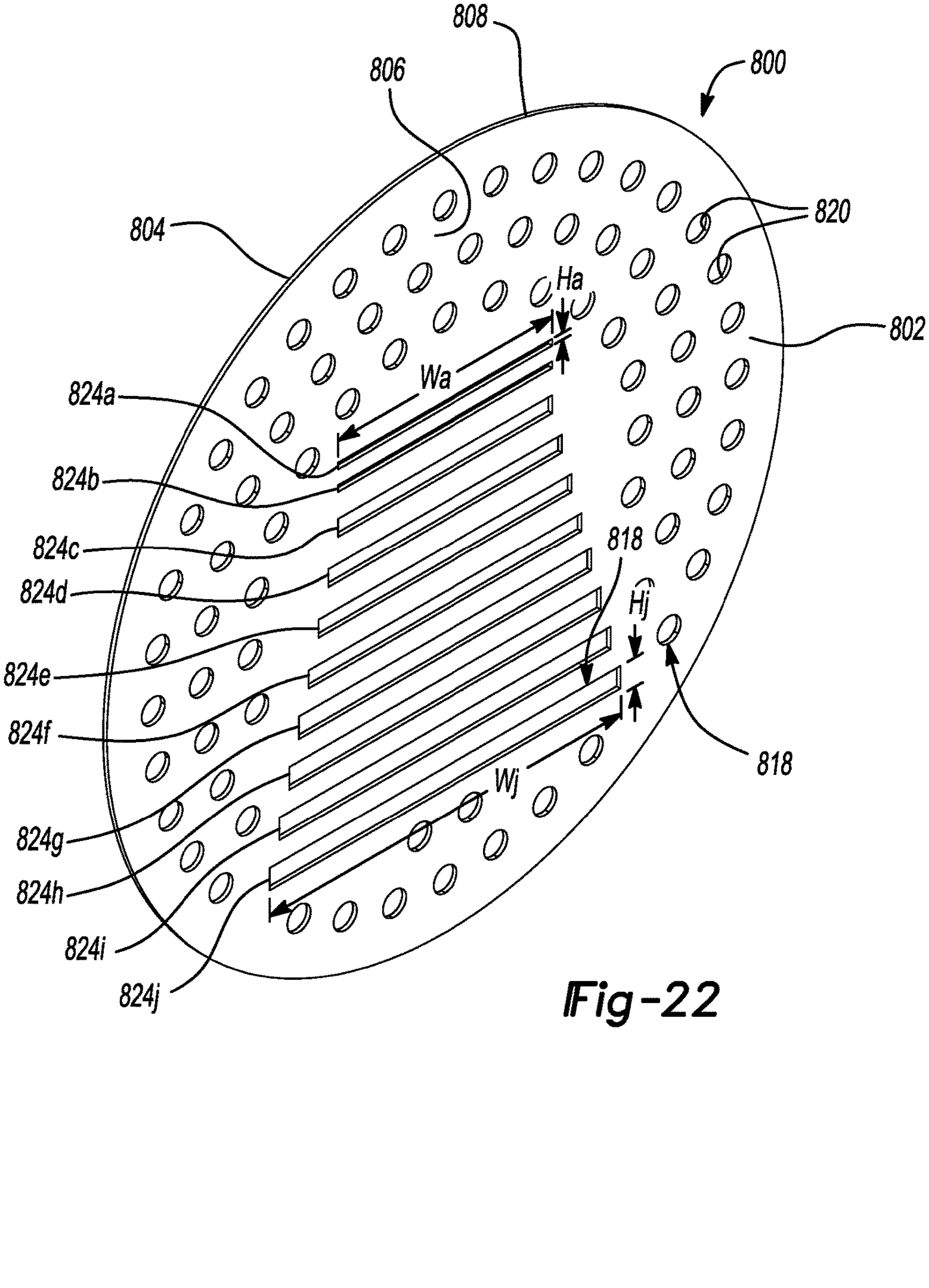
FIG. 22 is a perspective view of the flow modifier depicted in FIG. 21.

Louvers 710 may be tuned as desired. For example, louvers 710 can be in the form of tabs 714 punched from plate 702. Tabs 714 can each include different lengths, which allows for tailoring a target non-uniform flow distribution of the exhaust. Alternatively, louvers 710 can have any shape desired by one skilled in the art. For example, louvers 710 can be oval, round, triangular, and the like without departing from the scope of the present disclosure. Furthermore, louvers 710 can be slightly helically twisted to induce a greater amount of swirl in the exhaust flow that assists in intermingling the reagent exhaust treatment fluid with the exhaust. As best shown in FIG. 20, louvers 710 are staggered over plate 702, which allows for an increased amount of exhaust flow to be re-directed by flow modifier 700.

Flow modifier 700 should not be limited to being positioned upstream from injector 16. Flow modifier 700, rather, may be positioned directly beneath injector 16, or may be positioned downstream from injector 16. When flow modifier 700 is positioned directly beneath injector 16, large droplets of the reagent exhaust treatment fluid that do not immediately atomize and intermingle with the exhaust may impinge upon plate 702. Although the large droplets may impinge on plate 702, because flow modifier 700 is suspended within tube 708, the droplets are subjected to higher velocity exhaust flow that generally causes the droplets to sublimate rather than form deposits.

In addition, it should be understood that flow modifier 700 should not be limited to use in conjunction with injector 16. In contrast, it should be understood that injector 16 can be replaced by, for example, NOx sensor 25, a temperature sensor, pressure sensor, or the like. Use of flow modifier 700 in conjunction with a sensor allows for a non-uniform flow of the exhaust as it approaches the sensor, which can provide more accurate readings on exhaust temperature, NOx concentration, and the like.

FIGS. 21-25 illustrate another flow modifier 800 constructed in accordance with the principles of the present disclosure. Flow modifier 800 is shaped as a substantially circular plate 802 having a planar upstream surface 804, a planar downstream surface 806 and an outer cylindrical surface 808 interconnecting the two planar surfaces 804, 806. Cylindrical surface 808 is shaped and sized to mate with an inner surface 812 of an exhaust conduit 814. It should be appreciated that the circular shape is merely exemplary and cylindrical surface 808 may complement inner surface 812 regardless of the shape of the conduit.

Figure 23:
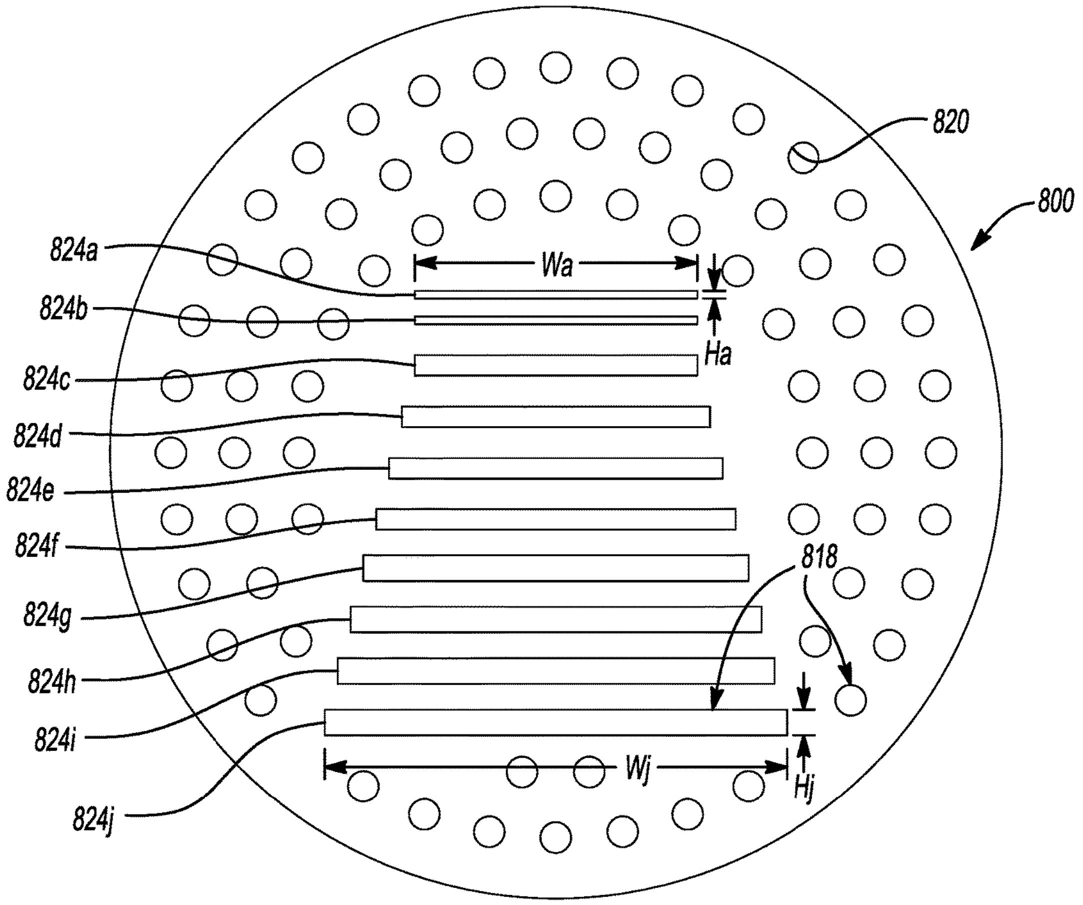
FIG. 23 is a front view of the flow modifier depicted in FIG. 22.

Flow modifier 800 is fixed to inner surface 812 of conduit 814 via a process such as welding at a position upstream from an injector 816. Exhaust flow is restricted from passing between outer cylindrical surface 808 and inner surface 812. As such, exhaust flow occurs through several apertures 818 extending through plate 802. Apertures 818 include various sizes and shapes. For example, a plurality of cylindrically-shaped bores 820 are spaced apart from one another each having the same or a similar diameter. Bores 820 are generally positioned on the peripheral areas of plate 802 to partially restrict the flow of the exhaust gas therethrough and divert the flow through slots 824*a*-824*j*. Slot 824*a* is substantially rectangularly shaped having a height, Ha and a width, Wa. Each of slots 824*b*-824*j* includes a different width. The height and width of slots 824*a* and 824*b* are substantially the same. Slots 824*c*-824*f* each have the same or a substantially similar height. Slots 824*g*-824*j* have the same or a substantially similar height. Slot 824*j* is depicted in FIG. 23 as having a height Hj and a width Wj.

Each of the slots extend substantially parallel to the other. The slots are designed such that the cross-sectional areas of the slots passing through plate 802 closest to the injector are smaller than the slot areas further from the injector. As the slot position becomes more distant from the injector, the cross-sectional area of each of the slots increases. The combination of bores 820 and slots 824*a*-824*j* modifies the exhaust flow pattern upstream of the injector.

Figure 24:
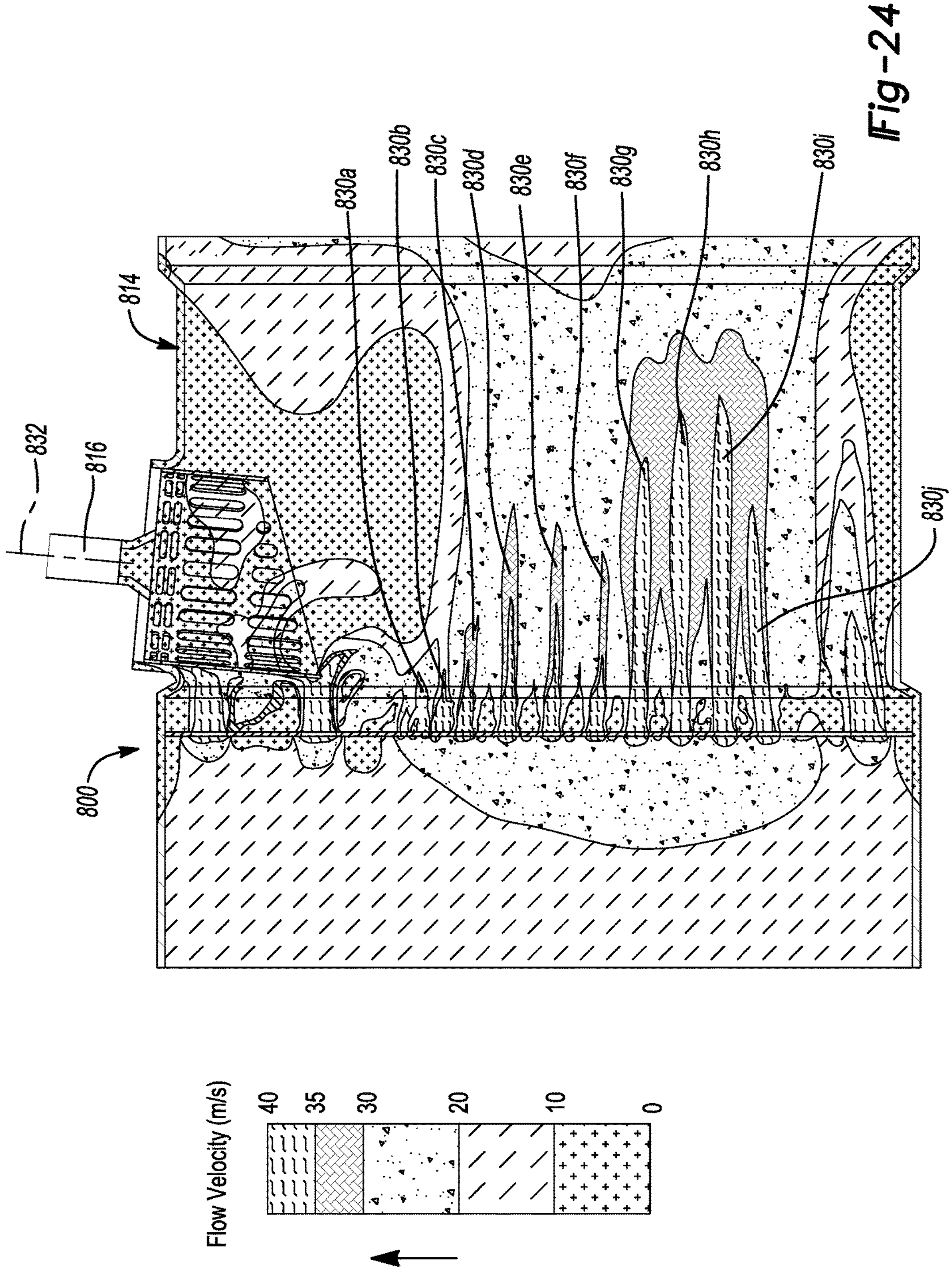
FIG. 24 is a cross-sectional side view of the flow modifier including plots depicting the exhaust flow velocity as exhaust passes through the flow modifier.

FIG. 24 provides a graphical representation of the exhaust flow velocity profile generated by flow modifier 800 as modeled using computational fluid dynamics (CFD). A greater magnitude on the scale indicates a higher flow velocity. One of the prominent features of the modified flow includes multiple high velocity zones 830*a*-830*j* arranged in parallel sheets. Depending on the position and the shape of the various apertures 818, parallel sheets 830*a*-830*j* of exhaust gas flowing through slots 824*a*-824*j* will extend downstream from plate 802 different penetration lengths. By varying the cross-sectional areas, shapes, and sizes of apertures 818, the size and shape of the high velocity zones may be custom tailored. It should be appreciated that flow modifier 800 is configured to produce distinct exhaust velocity profiles as previously described in relation to flow modifier 500 and the flow velocity profiles depicted in FIG. 14.

Figure 25:
FIG. 25 is a cross-sectional side view of the flow modifier including a plot depicting the spray droplet diameter as exhaust flows through the flow modifier during reductant injection.
Figure 27:
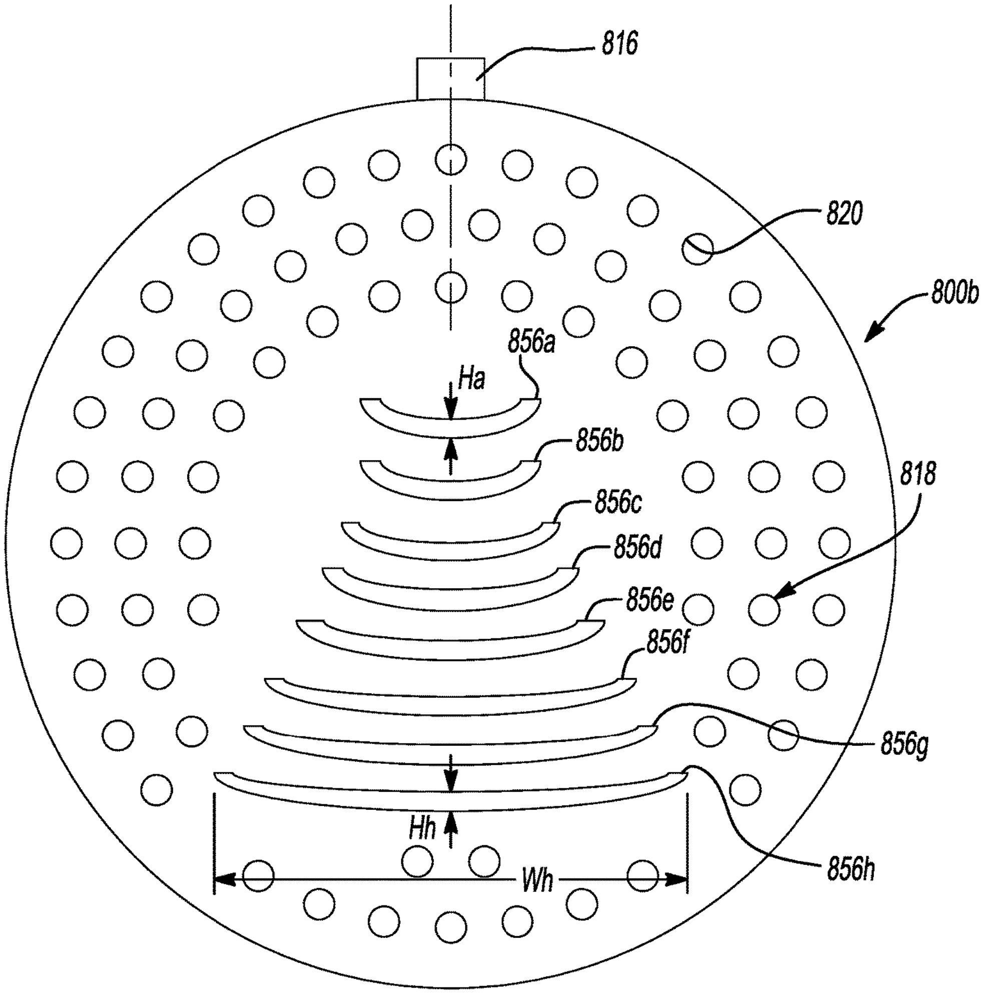

FIG. 25 provides a graphical representation of additional CFD analysis where urea is injected along an injection axis 832 while exhaust gas flows through flow modifier 800. It should be appreciated that bores 820 positioned at the uppermost central portion of plate 802 serve to restrict the flow of exhaust at locations adjacent the injector to protect the injected reductant spray from early exposure to exhaust gas. Typically, it is desirable to produce a substantially uniform distribution of atomized reductant across an upstream face of an exhaust treatment device such as an SCR. Accordingly, it may be desirable to have some of the reductant approach the sidewall of the conduit opposite injector 816, but not touch it. If necessary, an injector shield 826 may be implemented to further restrict exhaust flow interaction with the injected reductant until the reductant travels a sufficient distance away from the injector. Shield 826 may include apertures, louvers, flaps or the like to allow a portion of the exhaust gas to pass therethrough. A swirling gas pattern may be produced within shield 826.

In the embodiment depicted in FIGS. 24 and 25, injector 816 is inclined at an angle of approximately 5 degrees from perpendicular such that injected reductant is sprayed slightly upstream. It should be appreciated that this inclination angle is merely exemplary and that the flow modifier of the present disclosure may be used in conjunction with an injector oriented in any number of angles upstream, downstream or perpendicular to the exhaust flow stream.

A typical injector for spraying urea into an exhaust treatment system provides a conically-shaped pattern of urea droplets. Output from the injector may have droplets of different Sauter mean diameter (SMD). In general, droplets having a greater SMD have a greater mass and as such tend to resist deflection and atomization for a greater distance from the injector nozzle than droplets having a smaller SMD. Other injectors may produce two or more adjacent spray cones. Other injection systems may incorporate an air assist feature to simultaneously emit air and reagent from the injector. Each of these injectors may be used in combination with the flow modifier of the present disclosure.

In the arrangement depicted in the Figures, the spray cone is allowed to develop until it reaches 20-30% of the exhaust conduit diameter before it substantially interacts with exhaust flow passing through one of slots 824*a*-824*j*. The slots are positioned, sized and shaped such that at positions near the injector, injected droplets having a lesser SMD will interact with the high velocity zone sheets closer to the injector to atomize the smaller droplets. Droplets having a larger SMD will penetrate the high velocity zone sheets closest to the injector, but will be atomized by the high velocity zone sheets positioned further from the injector. These sheets, substantially sheets 830*g*-830*j*, also exhibit a higher penetration further downstream from flow modifier 800.

It should be appreciated that flow modifier 800 may also be referred to as a sheet atomizer based on the formation of several distinct and spaced apart high velocity zones in the shape of sheets. Flow modifier 800 urges the droplets to break apart thereby promoting evaporation without allowing reductant impingement on the conduit or flow modifier surfaces. As mentioned, previously known aftertreatment systems sometimes included a liquid injector outputting a urea spray that would impinge the opposing inner surface of the exhaust conduit. The injected urea would not successfully decompose but form a film layer on the conduit.

Figure 26:
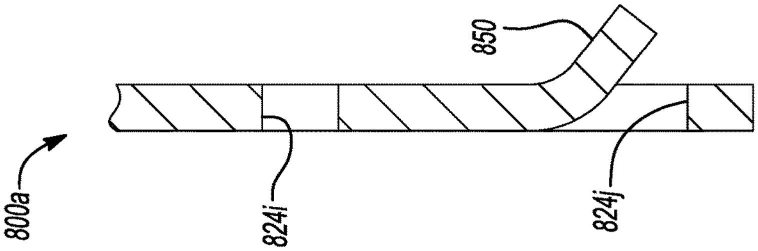
FIG. 26 is a fragmentary side view of an alternate flow modifier.

Through CFD modelling and incorporation of the present teachings, flow modifier 800 may be custom tuned to operate in conjunction with a given injector or family or injectors to minimize or eliminate injected reductant droplets from impinging on the inner surface of the conduit. Depending on the geometry of the exhaust conduit, spray characteristics of the injector and the distance to the downstream exhaust treatment device, it may be beneficial to incorporate additional features such as tabs or louvers into the flow modifier as depicted in FIG. 26. A flow modifier 800*a* is substantially similar to flow modifier 800 but includes a tab 850 for deflecting exhaust gas passing through slot 824*j* toward the inner surface of the conduit.

Other modifications to flow modifier 800 are contemplated and include varying the shape of the slots, varying the number of slots, changing the orientation of the slots relative to the position of the injector, as well as possibly including one or more additional plates positioned upstream or downstream of the previously described plate to further modify the exhaust flow. FIGS. 27-32 provide additional examples of flow modifiers identified with reference numerals 800*b*, 800*c*, 800*d*, 800*e*, 800*f*, and 800*g*. Flow modifier 800*b* depicted in FIG. 27 includes a plurality of curved slots 856*a*-856*h*. Each of the curved slots may have a height that varies across the width of the plate. Each of slots 856*a*-856*h* are spaced apart from one another and aligned in a substantially parallel arrangement. Generally speaking, the width of the slots increases as the distance of the slot from injector 816 increases. Each of slots 856*a*-856*h* exhibits a generally concave shape when viewed from injector 816.

Figure 28:
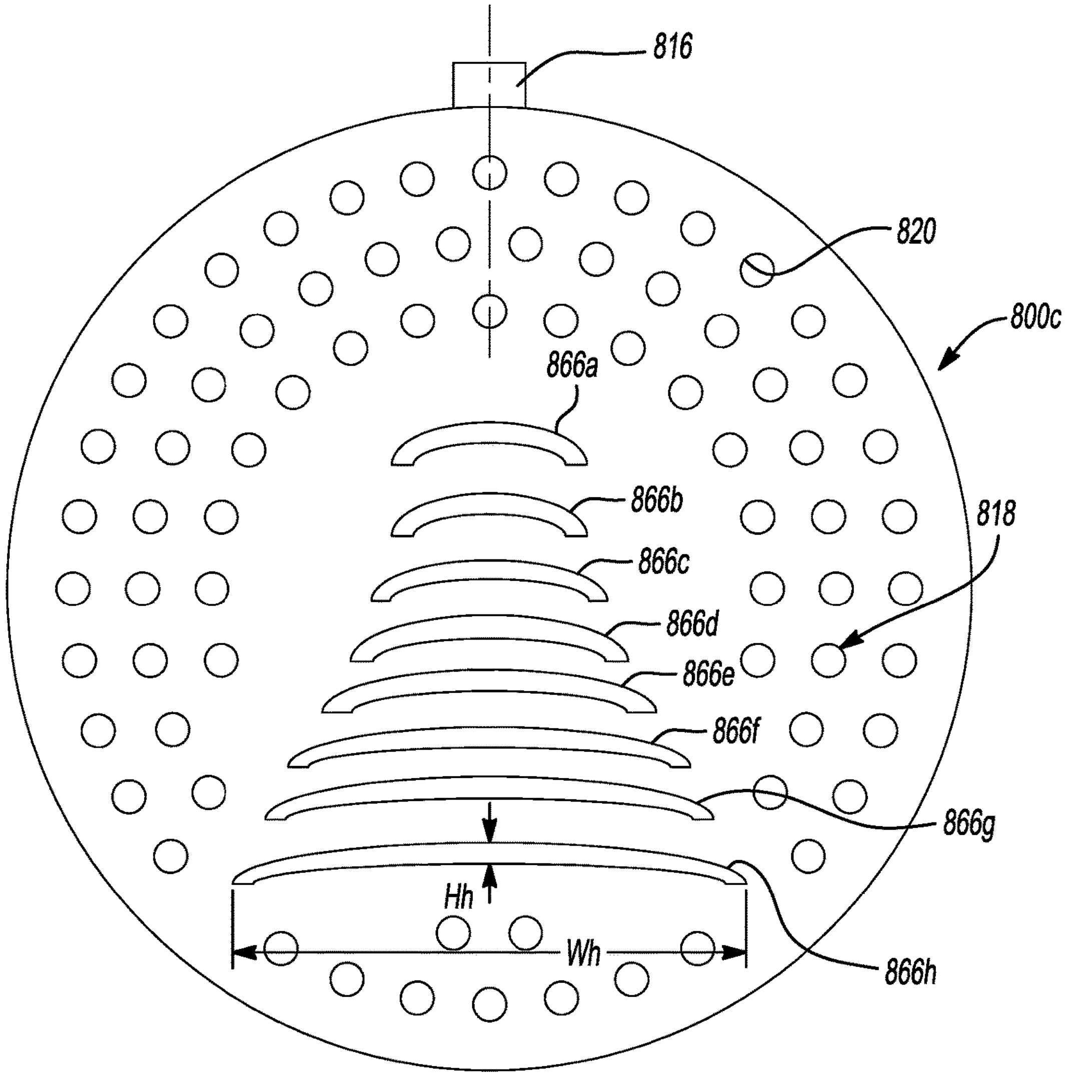

FIG. 28 depicts alternate flow modifier 800*c*. Flow modifier 800*c* is substantially similar to flow modifier 800*b* with the exception that a plurality of slots 866*a*-866*h* are oriented to exhibit a generally concave shape when viewed from injector 816.

Figure 29:
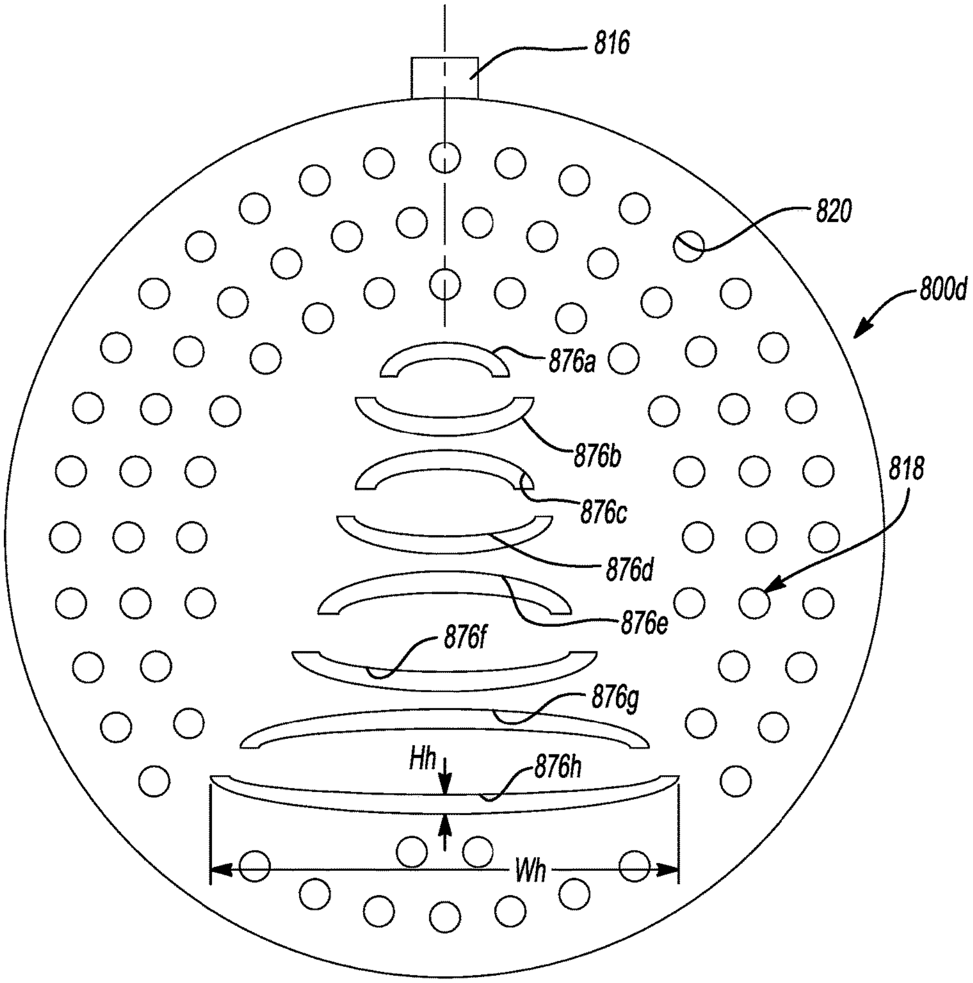

FIG. 29 depicts flow modifier 800*d* including slots 876*a*-876*h*. Each of the slots is curved. Alternating slots are oriented in an opposite direction. FIG. 29 depicts slot 876*a* oriented such that a convex surface is presented toward injector 816 while the adjacent slot 876*b* is oriented to present a concave surface toward injector 816. The alternating pattern continues across flow modifier 800*d*.

Figure 30:
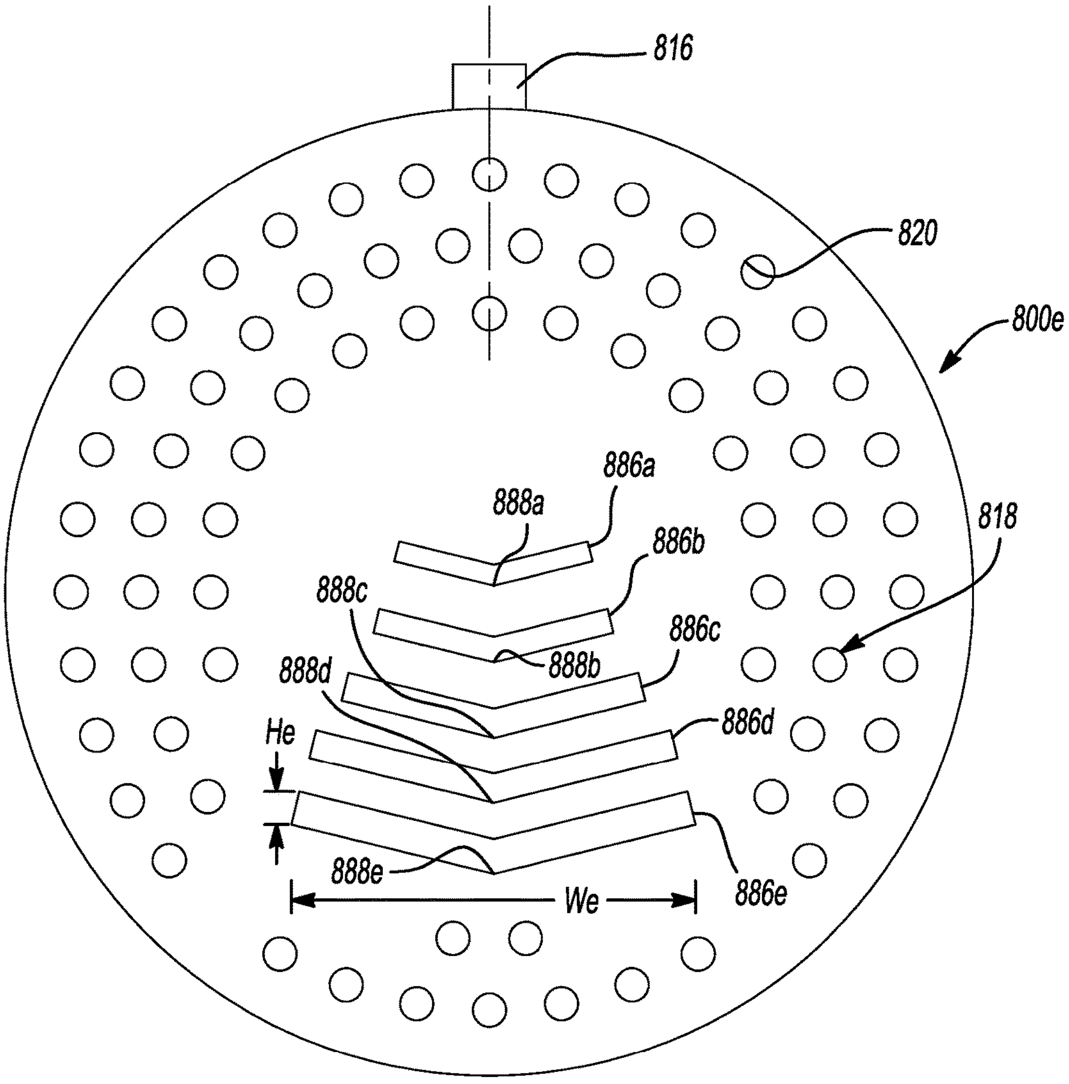

Another alternate flow modifier 800*e* is shown in FIG. 30. Flow modifier 800*e* includes a plurality of slots 886*a*-886*e*. Each of the slots extending through flow modifier 800*e* is shaped as a "V" or chevron with an apex 888*a*-888*e* positioned further from injector 816 than the terminal ends of the slots.

Figure 31:
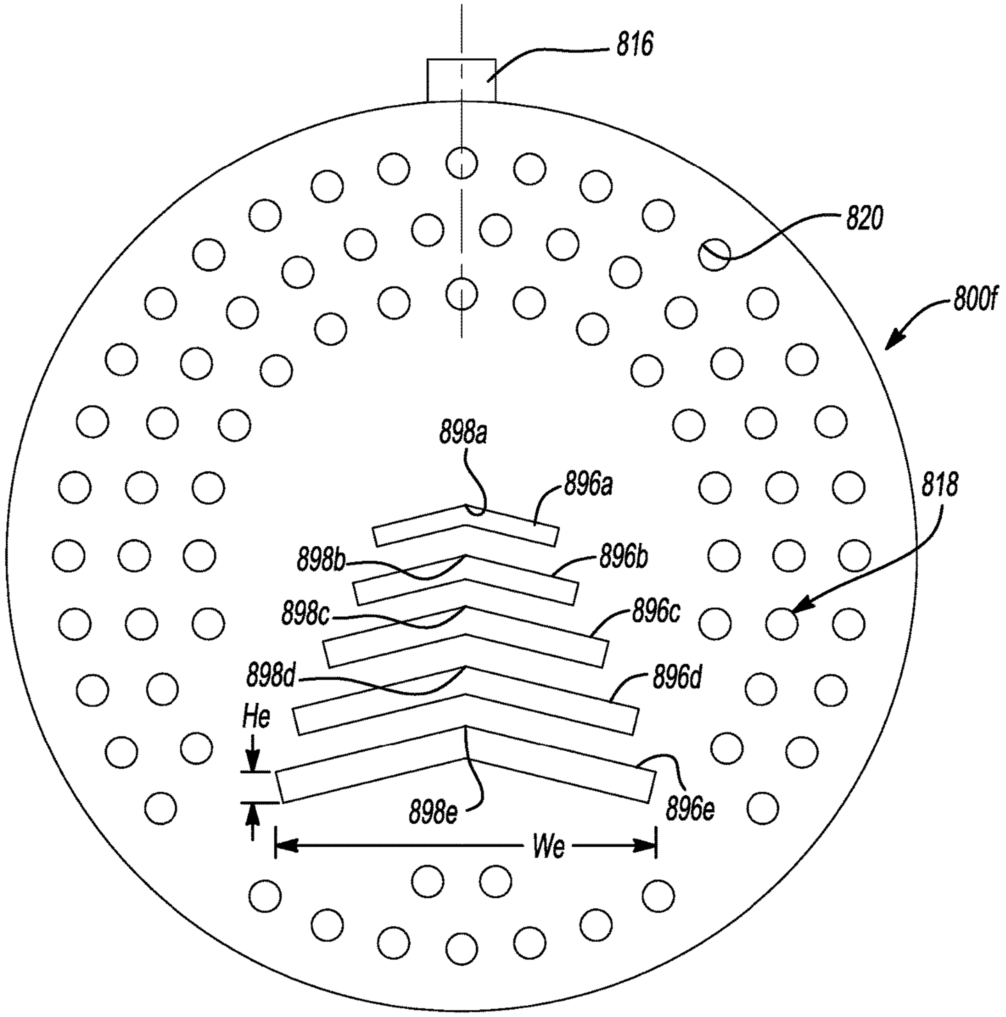

FIG. 31 shows another alternate embodiment flow modifier identified at reference numeral 800*f*. Flow modifier 800*f* is substantially similar to flow modifier 800*e* with the exception that the chevrons are inverted. Accordingly, a vertex 898*a* of slot 896*a* is closer to injector 816 than the terminal ends of slot 896*a*. Vertices 898*b*, 898*c*, 898*d*, and 898*e* are oriented closer to injector 816 than the respective terminal ends of each of the slots. Each of the slots 896*a*-896*e* is depicted having a substantially constant height across the width of each slot. The width of the slots increases as the distance from the injector increases.

It should be appreciated that the height of any one slot may be varied if a particularly shaped high velocity zone is desired. As such, it is within the scope of the present disclosure to custom tailor the three dimensional shape of any velocity profile extending downstream from a flow modifier by defining the shape, size and position of particular slots extending through the flow modifier.

Figure 32:
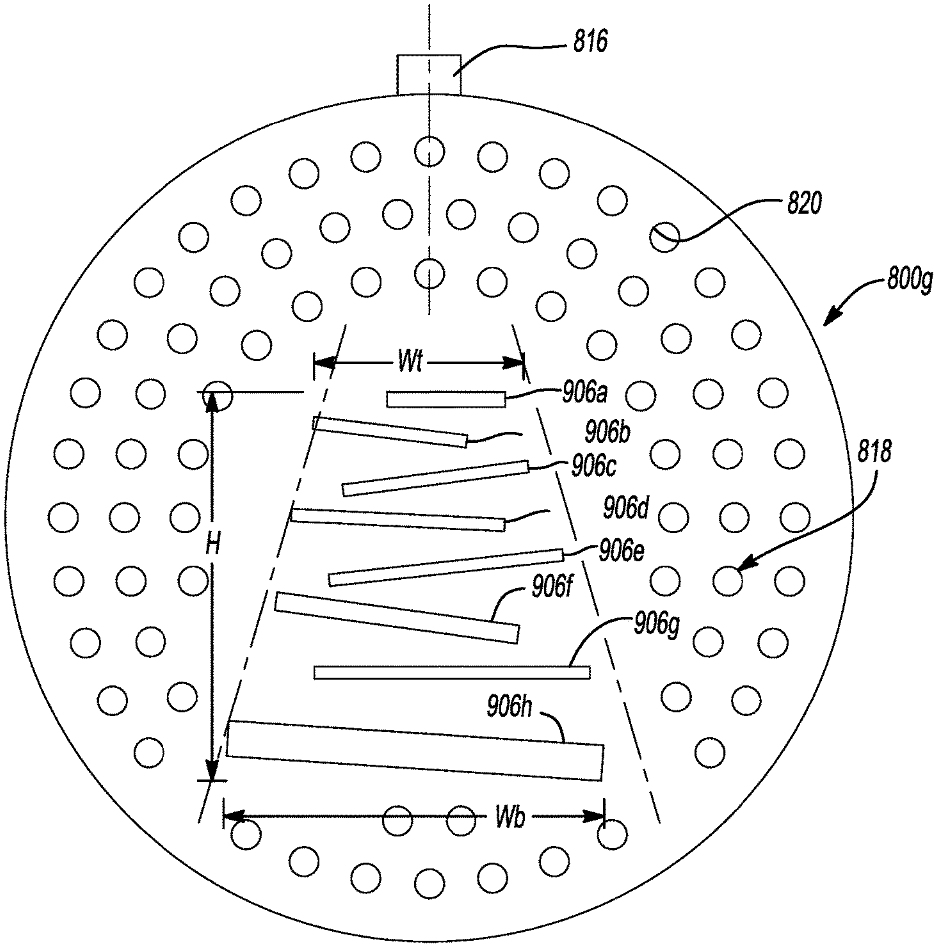

It is also within the scope of present disclosure to group several apertures in a pattern to obtain the desired mixing of injected reagent with exhaust gas flowing through a conduit. FIG. 32 provides a suitable example of such an exhaust flow modifier identified at reference numeral 800*g*. A plurality of slots 906*a*-906*h* are positioned in a non-parallel manner. The slots are, however, arranged in a generally triangular or possibly trapezoidal zone having a width at the top, Wt, and a width at the bottom of the trapezoid identified as Wb. The height of the trapezoidal zone is identified by letter H. The width of the trapezoidal zone increases as the distance from the injector increases. As is shown in FIG. 32, one or more of the slot heights may also be increased as the distance from the injector increases. A triangular or trapezoidal pattern accounts for the generally conically-shaped spray pattern exhibited by the reagent injector 816 and also accounts for the variance within the injected droplet size, as previously described.

FIGS. 33 and 34 depict another version of a flow modifier positioned upstream from injector 816. A flow modifier 950 is shown as being substantially similar to flow modifier 800 with the exception that four impingement plates extend downstream from the lower edges of four of the slots. Flow modifier 950 includes slots 956*a*-956*j*. A first impingement plate 960*f* is positioned along the lower edge of slot 956*f*. Another impingement plate 960*g* extends parallel to impingement plate 960*f* and is positioned adjacent to a lower edge of slot 956*g*. In similar fashion, impingement plates 960*h* and 960*i* extend parallel to the other impingement plates and adjacent to a lower edge of slots 956*h* and 956*i*, respectively. Each impingement plate 960*f*-960*i* extends substantially perpendicular to a plate 952 and downstream a distance different from the other. The impingement plate length increases as a distance from the side of the conduit on which the injector is mounted.

As depicted in FIG. 34, the axis of reagent injection 966 crosses the conduit at an upstream angle to maximize the number of droplets impinging upon impingement plates 960*f* and 960*i*. As drops of reagent impact an impingement plate, the droplets break up to form smaller sized droplets that may be more easily mixed with the exhaust gas.

The impingement plate version of the flow modifier also assists reagent mixing at low exhaust flow velocities by not only breaking up the droplets as previously mentioned but also positioning a concentrated high flow velocity sheet adjacent to liquid reagent that may collect on a surface of the impingement plate. The impingement plates also add thermal mass to the flow modifier which assists in atomization of the injected reagent. In addition, the presence of the impingement plate at a location immediately adjacent an edge of the slot amplifies the magnitude of the exhaust velocity sheet at that location.

FIG. 35 depicts another alternate flow modifier identified at reference numeral 980. Flow modifier 980 is similar to several of the other flow modifiers with the inclusion of slots 986*a*-986*f*. Flow modifier 980, however, also includes an inverted V-shaped slot 990 positioned further from the injector than slots 986*a*-986*f*. An inverted V-shaped plate 994 extends perpendicularly from a plate 982. V-shaped plate 994 is positioned adjacent the bottom edge of V-shaped slot 990. It should be appreciated that the inverted V-shape deters accumulation of injected liquid. The apertures 996 positioned beneath plate 994 function to minimize any exhaust gas recirculation in this zone of the exhaust conduit. The position of V-shaped plate 994 immediately adjacent V-shaped slot 990 assures high velocity flow across the upper surface of the V-shaped plate to minimize deposition of injected reagent on the plate.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An exhaust gas treatment system for reducing emissions from an engine, the system comprising:
- an exhaust treatment device;
- an exhaust conduit adapted to supply an exhaust stream from the engine to the exhaust treatment device, the conduit including an aperture;
- an injector for injecting a reagent through the aperture and into the exhaust stream; and
- a flow modifier positioned within the exhaust conduit upstream from the aperture, the flow modifier comprising a plate including a plurality of bores extending therethrough, the bores being spaced apart from one another and positioned about a periphery of the plate, the plate further including a plurality of slots extending therethrough, each slot being elongated having a width and a height, the width being greater than the height, each slot having a major axis extending across the width, the major axes being positioned in parallel with each other.

2. The exhaust gas treatment system of claim 1, wherein the slots increase in width as the slots approach an edge of the plate.

3. The exhaust gas treatment system of claim 1, wherein the bores surround the plurality of slots.

4. The exhaust gas treatment system of claim 1, wherein the slots modify the flow of exhaust such that the exhaust flow downstream of the flow modifier includes a plurality of velocity profiles shaped as parallel spaced apart sheets.

5. The exhaust gas treatment system of claim 1, wherein the plate includes a tab for changing a direction of the flow as the exhaust passes through one of the slots.

6. The exhaust gas treatment system of claim 1, wherein the slots are curved.

7. The exhaust gas treatment system of claim 1, wherein the slots have an increasing cross-sectional area as the slots approach an edge of the plate.

8. The exhaust gas treatment system of claim 1, wherein the flow modifier further includes a reductant impingement plate extending downstream from the plate along an edge of one of the slots.

9. The exhaust gas treatment system of claim 8, wherein one of the slots and its associated impingement plate are shaped as an inverted "V".

10. An exhaust gas treatment system for reducing emissions from an engine, the system comprising:
- an exhaust treatment device;
- an exhaust conduit adapted to supply an exhaust stream from the engine to the exhaust treatment device, the conduit including an aperture;
- an injector for injecting a reagent through the aperture and into the exhaust stream; and
- a flow modifier positioned within the exhaust conduit upstream from the aperture, the flow modifier comprising a plate including a plurality of bores extending therethrough, the bores being spaced apart from one another and positioned about a periphery of the plate, the plate further including a plurality of slots extending therethrough, the slots being positioned in parallel with each other, wherein the slots modify the flow of exhaust such that the exhaust flow downstream of the flow modifier includes a plurality of velocity profiles shaped as parallel spaced apart sheets, wherein the plate is oriented within the exhaust conduit such that an axis of reagent injection perpendicularly crosses the parallel sheets.

11. The exhaust gas treatment system of claim 1, wherein the slots are arranged in the shape of a triangle.

12. An exhaust gas treatment system for reducing emissions from an engine, the system comprising:
- an exhaust treatment device;
- an exhaust conduit adapted to summary an exhaust stream from the engine to the exhaust treatment device, the conduit including an aperture;
- an injector for injecting a reagent through the aperture and into the exhaust stream; and
- a flow modifier positioned within the exhaust conduit upstream from the aperture, the flow modifier comprising a plate including a plurality of bores extending therethrough, the bores being spaced apart from one another and positioned about a periphery of the plate, the plate further including a plurality of slots extending therethrough, the slots being positioned in parallel with each other, wherein the slots are arranged in the shape of a trapezoid, a base of the trapezoid being widest at a position where the trapezoid is closest to the edge of the plate.

13. An exhaust gas treatment system for reducing emissions from an engine, the system comprising:
- an exhaust treatment device;
- an exhaust conduit adapted to supply an exhaust stream from the engine to the exhaust treatment device, the conduit including an aperture;
- an injector for injecting a reagent through the aperture and into the exhaust stream; and
- a flow modifier positioned within the exhaust conduit upstream from the injector, the flow modifier comprising a plate including a plurality of slot; first, second, and third spaced apart slots extending therethrough, the third slot being positioned closer to an edge of the plate than the first and second slots, the second slot being positioned closer to the edge than the first slot, the slots having an increasing width as the slots approach the edge of the plate.

14. The exhaust gas treatment system of claim 13, wherein the plate includes a plurality of bores extending therethrough, the bores surrounding the slots.

15. The exhaust gas treatment system of claim 14, wherein the bores restrict the flow of exhaust toward the injector to allow the injected reagent to travel approximately 30 percent of an inner diameter of the exhaust conduit before interacting with the exhaust passing through one of the slots.

16. The exhaust gas treatment system of claim 13, wherein the slots modify the flow of exhaust such that the exhaust flow downstream of the flow modifier includes a plurality of velocity profiles shaped as parallel spaced apart sheets.

17. The exhaust gas treatment system of claim 13, wherein the third slot is closest to the edge of the plate and includes the greatest cross-sectional area of the slots.

18. An exhaust gas treatment system for reducing emissions from an engine, the system comprising:

an exhaust treatment device;

an exhaust conduit adapted to summary an exhaust stream from the engine to the exhaust treatment device, the conduit including an aperture;

an injector for injecting a reagent through the aperture and into the exhaust stream; and a flow modifier positioned within the exhaust conduit upstream from the injector, the flow modifier comprising a plate including a plurality of slots extending therethrough, at least two of the slots having an increasing width as the slots approach an edge of the plate, wherein the slots modify the flow of exhaust such that the exhaust flow downstream of the flow modifier includes a plurality of velocity profiles shaped as parallel spaced apart sheets, wherein the plate is oriented within the exhaust conduit such that an axis of reagent injection perpendicularly crosses the parallel sheets.

19. An exhaust gas treatment system for reducing emissions from an engine, the system comprising:

an exhaust treatment device;

an exhaust conduit adapted to supply an exhaust stream from the engine to the exhaust treatment device, the conduit including an aperture;

an injector for injecting a reagent through the aperture and into the exhaust stream; and a flow modifier positioned within the exhaust conduit upstream from the aperture, the flow modifier comprising a plate including a plurality of apertures extending therethrough, the plate sealingly engaged with an inner surface of the conduit such that all of the exhaust stream passes through the apertures in the plate, the apertures including slots as well as bores, wherein the slots are arranged in an area shaped as a trapezoid, the shortest parallel side of the trapezoid being positioned closer to the aperture than a longest parallel side of the trapezoid.

20. The exhaust gas treatment system of claim 19, wherein the bores restrict the flow of exhaust toward the injector to allow the injected reagent to travel approximately 30 percent of an inner diameter of the exhaust conduit before interacting with the exhaust passing through one of the slots.

21. The exhaust gas treatment system of claim 20, wherein the slots are positioned in parallel with one another.

22. The exhaust gas treatment system of claim 19, wherein a slot closest to an edge of the plate includes the greatest cross-sectional area of the plurality of slots.

23. The exhaust gas treatment system of claim 19, wherein the slots are arranged in an area shaped as a triangle.

24. The exhaust gas treatment system of claim 19, wherein the bores surround the slots within the trapezoid.

25. The exhaust gas treatment system of claim 19, wherein the flow modifier further includes an impingement plate extending downstream from the plate along an edge of one of the slots.

26. The exhaust gas treatment system of claim 25, wherein one of the slots and its associated impingement plate are shaped as an inverted "V".

27. The exhaust gas treatment system of claim 19, wherein the plate is perpendicularly oriented relative to a longitudinal axis of the exhaust conduit.

* * * * *

UNITED STATES PATENT AND TRADEMARK OFFICE
CERTIFICATE OF CORRECTION

PATENT NO. : 9,726,063 B2  
APPLICATION NO. : 14/956727  
DATED : August 8, 2017  
INVENTOR(S) : Manoj K. Sampath et al.

Page 1 of 1

It is certified that error appears in the above-identified patent and that said Letters Patent is hereby corrected as shown below:

In the Claims

Column 14, Line 29:  In Claim 12, delete "summary" and insert --supply-- therefor Column 14, Line 55:  In Claim 13, after "including", delete "a plurality of slot;"

Column 15, Line 14:  In Claim 18, delete "summary" and insert --supply-- therefor Signed and Sealed this  
Twelfth Day of December, 2017

Joseph Matal  
*Performing the Functions and Duties of the*  
*Under Secretary of Commerce for Intellectual Property and*  
*Director of the United States Patent and Trademark Office*